United States Patent
Choi et al.

(10) Patent No.: US 12,113,962 B1
(45) Date of Patent: Oct. 8, 2024

(54) METHODS AND SYSTEMS FOR AN EFFICIENT INTER-PREDICTION STRUCTURE AND SIGNALING FOR LOW-DELAY VIDEO STREAMING

(71) Applicant: Amazon Technologies, Inc., Seattle, WA (US)

(72) Inventors: Byeongdoo Choi, Irvine, CA (US); Christopher Andrew Segall, Camas, WA (US); Kiran Mukesh Misra, Camas, WA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 17/886,111

(22) Filed: Aug. 11, 2022

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/172* (2014.11); *H04N 19/577* (2014.11); *H04N 19/159* (2014.11)

(58) Field of Classification Search
CPC .. H04N 19/105; H04N 19/159; H04N 19/175; H04N 19/577
See application file for complete search history.

(56) References Cited

U.S. PATENT DOCUMENTS

| | | | |
|---|---|---|---|
| 2012/0183067 A1* | 7/2012 | Maani | H04N 19/70 375/E7.125 |
| 2012/0250773 A1* | 10/2012 | Chien | H04N 19/172 375/E7.2 |

(Continued)

OTHER PUBLICATIONS

Han et al., "A Technical Overview of AV1", Proceedings of the IEEE, vol. 109, No. 9, Sep. 2021, pp. 1435-1462.

(Continued)

*Primary Examiner* — Jeremiah C Hallenbeck-Huber
(74) *Attorney, Agent, or Firm* — NICHOLSON DE VOS WEBSTER & ELLIOTT LLP

(57) ABSTRACT

Techniques for an efficient inter-prediction structure and signaling for low-delay streaming of live video are described. According to some examples, a computer-implemented method includes receiving a live video at a content delivery service, determining a subset of candidate reference frames from a plurality of frames received of the live video, generating an identification code, for the subset of candidate reference frames, having a multiple-bit format that includes a first bit value to indicate a corresponding candidate reference frame is a reference frame for an input frame from the live video and a second bit value to indicate the corresponding candidate reference frame is not the reference frame for the input frame from the live video, and, when a bit of the identification code for a first candidate reference frame is set to the first bit value to indicate the first candidate reference frame is one of a forward reference frame and a backward reference frame for the input frame from the live video, an immediately following bit of the identification code being set to the first bit value indicates the first candidate reference frame is also another of the one of the forward reference frame and the backward reference frame for the input frame from the live video, performing a real time encode of the input frame of the live video based at least in part on the identification code to generate an encoded frame by the content delivery service, and transmitting the encoded frame from the content delivery service to a viewer device.

21 Claims, 16 Drawing Sheets

(51) Int. Cl.
*H04N 19/172* (2014.01)
*H04N 19/577* (2014.01)

(56) References Cited

U.S. PATENT DOCUMENTS

| | | | |
|---|---|---|---|
| 2017/0064313 A1* | 3/2017 | Wu | H04N 19/70 |
| 2018/0220152 A1* | 8/2018 | Mukherjee | H04N 19/20 |
| 2019/0052897 A1* | 2/2019 | Han | H04N 19/176 |

OTHER PUBLICATIONS

Lin et al., "Efficient AV1 Video Coding Using a Multi-Layer Framework", 2018 Data Compression Conference, IEEE, 2018, pp. 365-373.

Wang, Yunqing, "Disable Config MV Search Range", Retrieved from <https://gitlab.com/AOMediaCodec/avm/-/tree/research-v3.0.0>, Retrieved on May 27, 2022, pp. 1-6.

* cited by examiner

METHODS AND SYSTEMS FOR AN EFFICIENT INTER-PREDICTION STRUCTURE AND SIGNALING FOR LOW-DELAY VIDEO STREAMING

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

DETAILED DESCRIPTION

Figure 1:
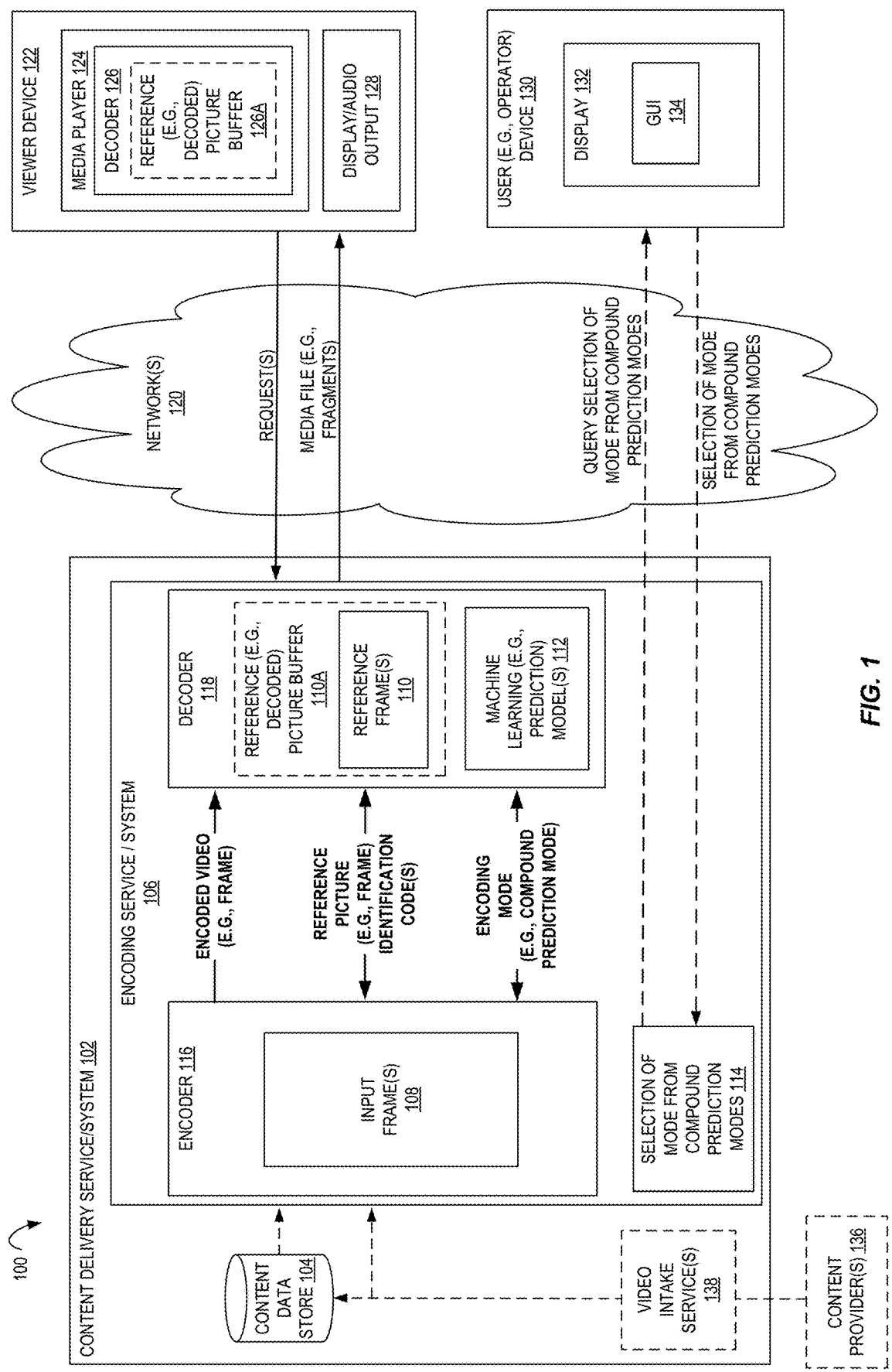
FIG. 1 is a diagram illustrating an environment including a content delivery service/system, having an encoding service/system to encode a media file according to a reference picture identification code format, to send the encoded media file to a viewer device according to some examples.

The present disclosure relates to methods, apparatus, systems, and non-transitory computer-readable storage media for managing reference frames in a video coding system. Examples herein provide an efficient inter-prediction structure and/or signaling for low-delay streaming of (e.g., live) video. A coding algorithm (e.g., specified by a video coding standard) may select between inter and intra coding for (e.g., block-shaped) regions of each picture (e.g., frame). In certain examples, inter coding (e.g., as indicated by an "inter" mode) uses motion vectors for (e.g., block-based) inter prediction from other "reference" pictures (e.g., frames), e.g., to exploit temporal statistical dependencies between different pictures. The reference pictures (e.g., reference frames) may be stored in a reference (e.g., decoded) picture buffer. In certain examples, a prediction (e.g., a block predicted) for an input frame from one reference frame (e.g., with a corresponding motion vector) is from a single prediction mode, and a prediction (e.g., block predicted) for an input frame using two different reference frames (e.g., and two corresponding motion vectors) is from a compound prediction mode. In certain examples, a compound prediction chooses the two reference frames (e.g., predictions) from two different directions (e.g., one from forward in display order from the input frame and the other from backward in display order from the input frame), or the same direction, and generates a new predictor by averaging with the same weight or different weights the two single predictors.

Certain examples herein enable an input (e.g., current) frame to identify (e.g., via an identification code) (e.g., identify and use) a single reference frame as both a first reference frame and a second reference frame, e.g., respective blocks thereof. Certain examples herein introduce a compound mode syntax that allows both predictions to refer to the same single reference picture (e.g., but different motion vectors thereof). Certain examples herein enable an input (e.g., current) frame to reference (e.g., via an identification code) a previous frame with two different motion vectors. Certain examples herein utilize a sorting algorithm that provides a benefit for different prediction structures and content types. Examples herein improve low latency coding, e.g., for live video encoding and/or decoding.

In certain (e.g., streaming) video applications, it is desirable to use a temporal prediction structure, for example, one that is different from a random-access (e.g., forward and backward) configuration (e.g., defined in common test conditions (CTC)). In certain examples, the temporal prediction structure allows an input (e.g., current) frame to identify (e.g., via an identification code) a single reference frame as both a first reference frame and a second reference frame. In certain examples, an identification code has a format that, when a bit of the identification code for a first candidate reference frame is set to a first bit value (e.g., 1) to indicate the first candidate reference frame is a first reference frame for the input frame from the video, an immediately following bit of the identification code being set to the first bit value (e.g., 1) indicates the first candidate reference frame is also a second reference frame for the input frame from the video. In certain examples, an identification code has a format that, when a bit of the identification code for a first candidate reference frame is set to the first bit value (e.g., 1) to indicate the first candidate reference frame is one of a forward reference frame and a backward reference frame for the input frame from the live video, an immediately following bit of the identification code being set to the first bit value (e.g., 1) indicates the first candidate reference frame is also another of the forward reference frame and the backward reference frame for the input frame from the live video (e.g., used as both forward reference frames in one example and used as both backward reference frames in another example). Examples herein thus allow for the management of video latency, pipeline duration, packaging operations, segment size, buffering, network propagation, and/or content characteristics. In certain examples, a temporal prediction structure is a CTC low-latency configuration.

With time-sensitive video contents, such as live sports games, and e-sport contents, customers of live video content expect to watch the events without delays. In the real-time video streaming entertainment services, video latency problems may damage the confidence of viewers. The following factors may cause video latency: video encoding pipeline duration, segment size/random access period, packaging operation, buffering, and/or network propagation. In certain examples, among these various factors, video encoding pipeline, segment size, and buffering issues are dominated by the design of group of picture (GOP) structure with hierarchical dependencies of pictures and decoded picture buffer (DPB) management. In certain examples, reducing video streaming latency by shortening segment size and minimizing buffering results in sacrificing the compression efficiency, which may affect the visual quality to video customers. Therefore, it is a challenge to develop efficient coding technologies, which improve the compression efficiency for certain (e.g., low-delay) configurations. Examples herein are directed to an efficient inter-prediction structure for low-delay configuration and a novel signaling method to represent the dependency across pictures is described.

Technical issues in some (e.g., identification codes) coding (e.g., decoding) algorithms (e.g., specified by a video coding standard) include (i) a compound mode prediction cannot refer to the same reference slot (e.g., same reference frame), and/or (ii) the values of the display order hints are not matched between encoder and decoder. Examples herein provide a technical solution to these issues (e.g., and improve the functioning of a computer-implemented service) by the use of a temporal prediction structure to allow an input (e.g., current) frame to identify (e.g., via an identification code) a single reference frame as both a first reference frame and a second reference frame, e.g., according to one or more of the formats disclosed herein (e.g., in compound mode).

In certain examples, an encoding mode (e.g., with different encoding modes selectable for each block of a frame) is selected for a video encoder. In one example, the video coding standard is an Advanced Video Coding (AVC) standard, for example, a H.264 standard. In one example, the video coding standard is an Alliance for Open Media (AOM) standard, for example, an AV1, AV2, etc. standard.

FIG. 1 is a diagram illustrating an environment including a content delivery service/system 100, having an encoding service/system 106 to encode a media file (e.g., input frame(s) 108) according to a reference picture identification code format (e.g., of the one or more (e.g., compound) encoding modes), to send the encoded media file to a viewer device 122 according to some examples. In certain examples, video compression (e.g., of a content delivery service/system/service) includes an encoding mode for certain proper subset(s) of the input video.

Encoding (e.g., by encoder 116) may compress a video file (e.g., input frame(s) 108) into a plurality of compressed frames, for example, one or more intra-coded picture frames (I-frames) (e.g., with each I-frame as a complete image), one or more predicted picture frames (P-frames or delta-frames), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In one example, each single I-frame includes a plurality of inter-coded frames (e.g., P-frames and/or B-frames), e.g., as a group of pictures (GOP). In certain examples, an encoder selects one or more prediction styles for a slice (e.g., a sequence of macroblocks), for example, switching I (SI) frame (e.g., slice) that facilitates switching between coded streams (e.g., containing SI-macroblocks as a special type of intra coded macroblock and/or switching P (SP) frame (e.g., slice) that facilitates switching between coded streams (e.g., containing contains P and/or I-macroblocks).

An encoding algorithm (e.g., specified by a video coding standard) may select between inter and intra coding for (e.g., block-shaped) regions of each picture (e.g., frame 108). In certain examples, inter coding (e.g., as indicated by an "inter" mode) uses motion vectors for (e.g., block-based) inter prediction from other pictures (e.g., frames), e.g., to exploit temporal statistical dependencies between different pictures. The reference pictures (e.g., reference frames) 110 may be stored in a reference picture buffer 110A. In certain examples, intra coding (e.g., as indicated by an "intra" mode) uses various spatial predictions to exploit spatial statistical dependencies in the source signal for a single picture (e.g., frame). In certain examples, motion vectors and intra prediction modes are specified for a variety of block sizes in the picture. In certain examples, the prediction residual is then further compressed using a transform to remove spatial correlation inside the transform block before it is quantized, producing an irreversible process that typically discards less important visual information while forming a close approximation to the source samples. In certain examples, the motion vectors or intra prediction modes are combined with the quantized transform coefficient information and encoded, e.g., using either variable length coding or arithmetic coding.

An encoding mode (e.g., to be used to encode a particular macroblock of a frame) may include one, all, or any combination of the following: direct mode, inter mode, or intra mode. A direct mode may cause encoding with an inter prediction for a block for which no motion vector is decoded. Examples of two direct prediction modes are spatial direct prediction mode and temporal prediction mode.

In certain examples, a mode has one or more sub-modes that are to be specified. In same examples, the same (e.g., prediction) mode is used for corresponding chroma (component) and luminance (component) blocks.

For example, a direct mode may include a skip mode (e.g., sub-mode) and/or a B-frame (e.g., B-slice) direct mode (e.g., sub-mode). In one example, skip mode is for P-frames (e.g., P-slices), for example, where the (e.g., spatial direct prediction) motion is derived directly from previously encoded information (e.g., thus not having to encode any additional motion data for a macroblock). In one example, direct mode is for B-frames (e.g., B-slices), for example, where the (e.g., temporal prediction) motion is derived directly from previously encoded information (e.g., thus not having to encode any additional motion data for a macroblock). Previously encoded information may be stored in a reference picture buffer 110A, for example, list 0 (L0) references being a reference picture list used for inter prediction of a P, B, or SP slice (e.g., block). In certain examples, inter prediction used for P and SP slices uses (reference picture) list 0 (L0). Owing to the bi-predictive (e.g., before or after the current frame in video order), a certain (e.g., DIRECT) mode may utilize two motion vectors pointing to different references. In certain examples, inter prediction used for B slices uses (reference picture) list 0 and (reference picture) list 1 (L1).

For example, an inter mode (e.g., sub-mode) may include a (e.g., luminance) block partition size, e.g., 16×16, 16×8, 8×16, or 8×8 (pixels×pixels). An inter mode may use a transform, e.g., a 4×4 transform or 8×8 transform.

For example, an intra mode (e.g., sub-mode) may include a (e.g., luminance) block partition size, e.g., intra4×4, intra8×8 and intra16×16. For example, intra4×4 may include further prediction sub-modes of vertical, horizontal, DC, diagonal-down-left, diagonal-down-right, vertical-right, horizontal-down, vertical-left, and/or horizontal-up.

An encoding mode may be used to encode a particular slice of a frame, e.g., where a slice is a spatially distinct region of a frame that is encoded separately from any other region in the same frame and/or where a slice is a plurality of macroblocks (e.g., a sequence of macroblock pairs).

An encoding mode (e.g., of encoder 116) may be separate from encoder settings, e.g., separate from values setting one, all, or any combination of the following in an encoder: spatial adaptive quantization strength, temporal adaptive quantization strength, flicker reduction, dynamic group-of-pictures (GOP) on/off, number of B-frames (e.g., per GOP), direct mode (e.g., allowing B-frames to use predicted motion vectors instead of actual coding of each frame's motion) (e.g., for a scene), prefilter on/off, delta quantization parameter (QP) offsets (e.g., between I-frame and P-frames/B-frames), rate distortion optimization quantization (RDOQ), speed settings, or additional configuration (e.g., encoder) settings.

In certain examples (e.g., at the start of the video encoding process) a content delivery service/system/service is to select the encoding modes, e.g., for each macroblock (or block or slice) of a frame. This may include a mode selection that is to select a (e.g., optimal from a visual quality perspective) single mode by looping through all the available modes by encoding (e.g., by encoder 116) according to a mode then decoding (e.g., by decoder 118) and measuring the quality between the media (e.g., macroblock) that was encoded versus the decoded version.

In certain examples (e.g., for a compound mode), encoder 116 is to encode a frame 108 and send it to decoder 118 to decode the encoded frame. In certain examples, a version of the frame 108 is reconstructed out of the bitstream by the decoder 118. In certain examples, one or more of the decoded frames, from the encoder 116, generated by the decoder 118 is input into reference (e.g., decoded) picture buffer 110A (e.g., decoded frame buffer/list or reference frame buffer/list). In certain examples, the reference frame (s) 110 in the picture buffer 110A (e.g., which is less than all of the frames in a video) are used to encode an input frame 108, for example, via an inter prediction (e.g., prediction value) for the current frame using previously decoded reference frames 110.

Certain (e.g., AOM) coding standards (e.g., codecs) allow a maximum number of (e.g., eight frames) frames in its reference picture buffer 110A. In certain examples, for encoding a frame 108, encoder 116 can choose a proper subset of (e.g., seven) frames from the reference picture buffer 110A as its reference frames. In certain examples, the bitstream allows the encoding service/system 106 to explicitly assign each reference a unique reference frame index (e.g., ranging from 1 to 7). In some examples, the reference frames indices 1-4 are designated for the frames that precede the current frame in display (e.g., picture or video) order, while indices 5-7 are for reference frames coming after the current one. In certain examples of compound inter prediction, two references can be combined to form the prediction. In certain examples, if both reference frames either precede or follow the current frame, this is a unidirectional compound prediction, e.g., in contrast with a bidirectional compound prediction where there is one previous and one future reference frame in display (e.g., picture or video) order. In certain examples, the encoding service/system 106 assigns a reference frame index to any frame in the decoded frame buffer, e.g., which allows it to fill all the reference frame indices when there are not enough reference frames on either side. In certain examples, when a frame coding is complete, the encoding service/system 106 decides which (if any) reference frame in the reference picture buffer 110A to replace, e.g., and explicitly signals this in the bitstream. In certain examples, encoding service/system 106 allows for bypassing of updating the reference picture buffer 110A, e.g., for high motion videos where certain frames are less relevant to neighboring frames.

In certain examples, the reference picture buffer 110A update is implemented through two syntaxes in the frame level: (1) a multiple bit (e.g., eight-bit) reference Refresh Flag, e.g., with each bit signaling whether the corresponding frame in the reference picture buffer 110A is to be refreshed or not by the newly coded frame, and/or (2) virtual index mapping where each of the reference frames is labeled by a unique virtual index, and both the encoder 116 and the decoder 118 maintain a reference frame map to associate a virtual index with the corresponding physical index that points to its location within the reference picture buffer 110A. In certain examples, both the refresh flag and the virtual indices are written into the bitstream, e.g., using such mapping mechanism is to avoid memory copying whenever reference frames are being updated.

Figure 6:
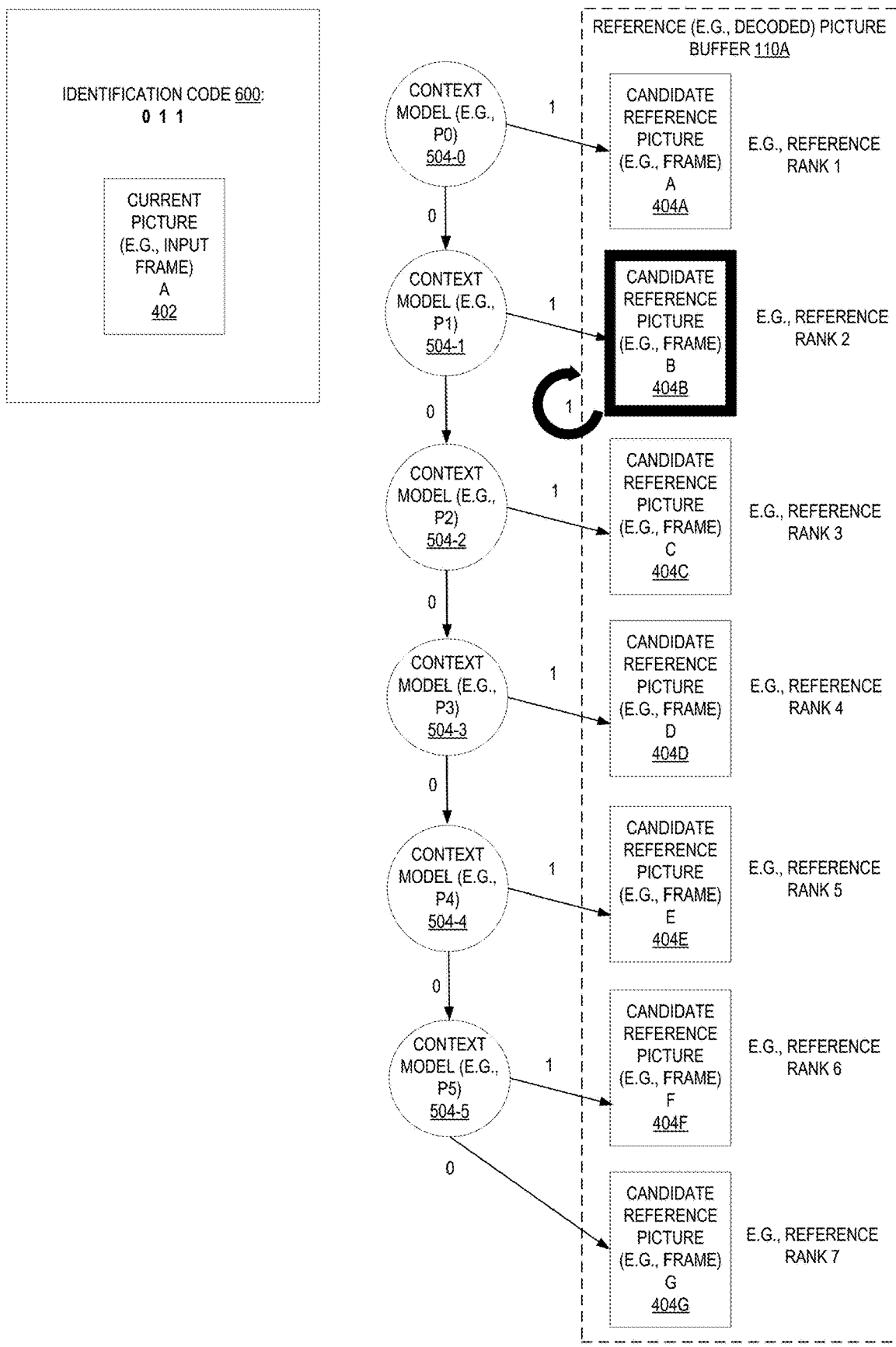
FIG. 6 is a diagram illustrating a second reference picture identification code format with an example with multiple references to the same reference picture, candidate reference pictures (e.g., frames), and a context tree according to some examples.
Figure 7:
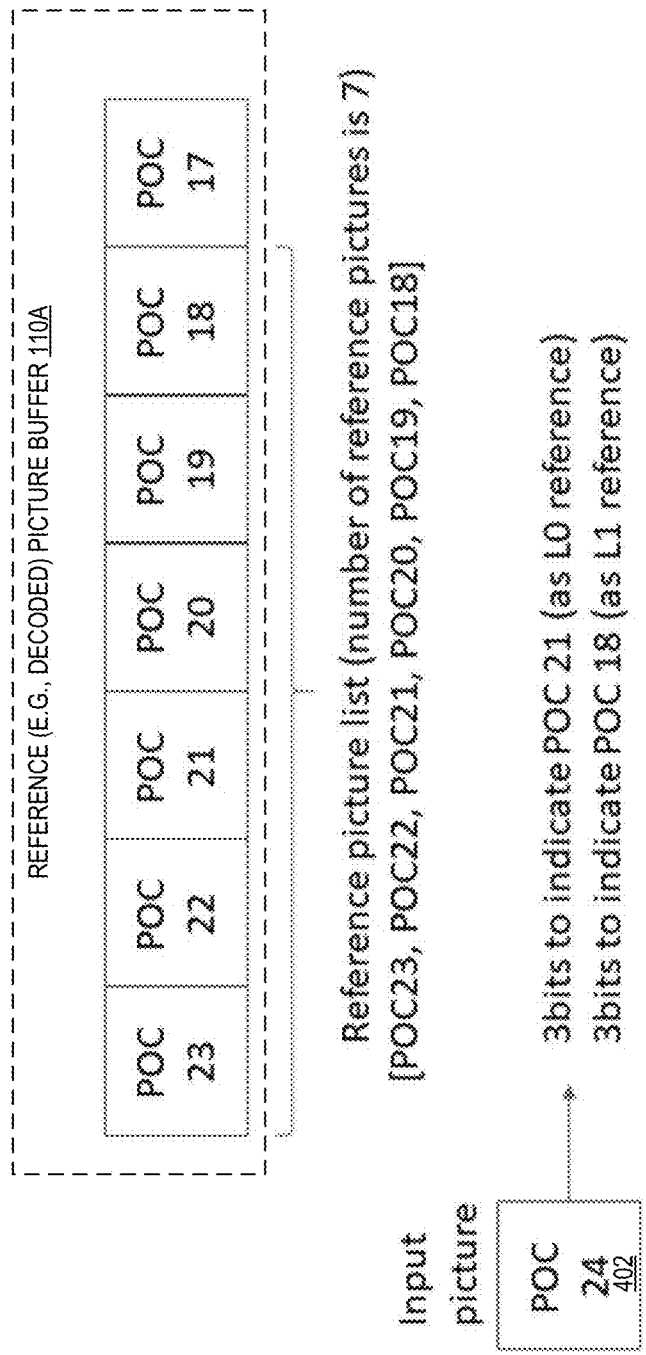
FIG. 7 is a diagram illustrating a first example of a reference picture indication for compound prediction mode according to some examples.
Figure 8:
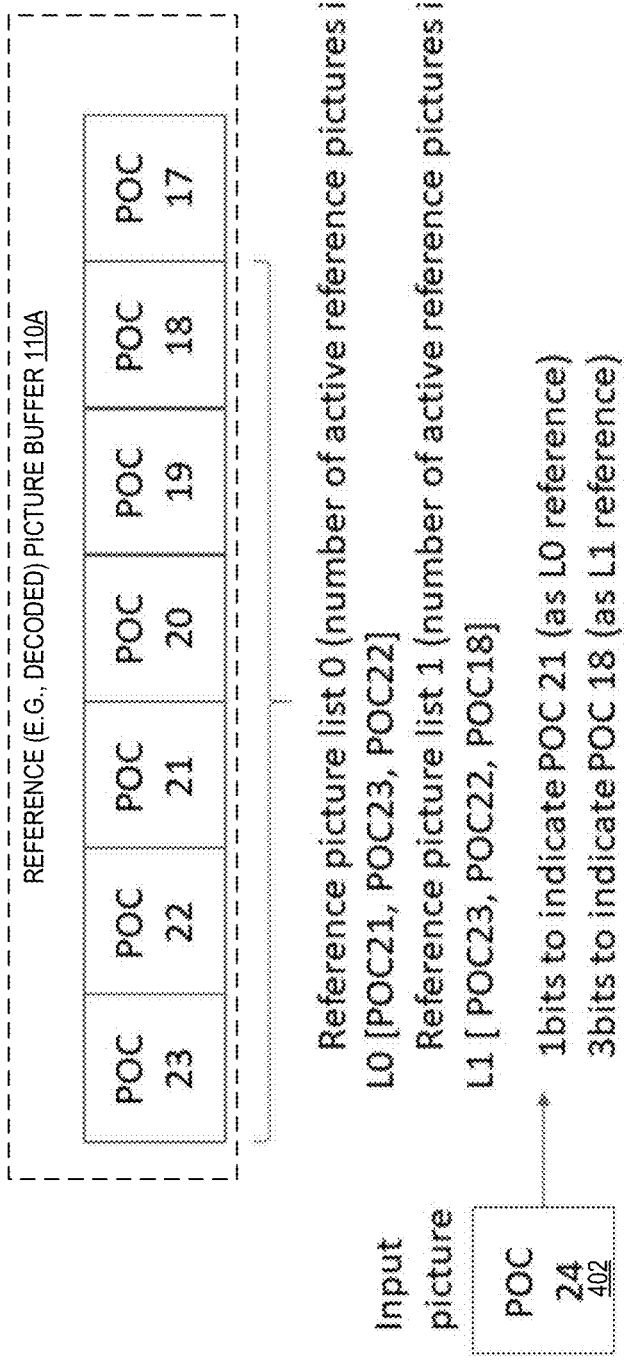
FIG. 8 is a diagram illustrating a second example of a reference picture indication for compound prediction mode according to some examples.
Figure 9:
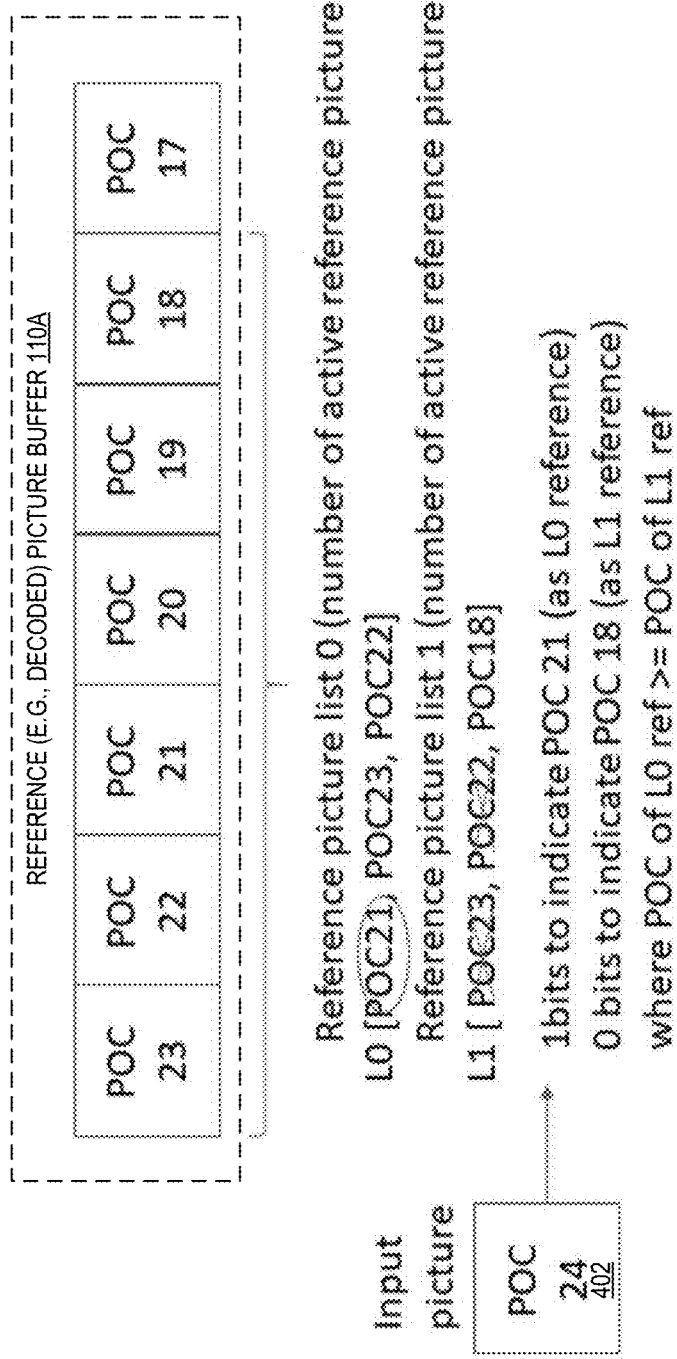
FIG. 9 is a diagram illustrating a third example of a reference picture indication for compound prediction mode according to some examples.

In certain examples, encoding service/system 106 includes a field 114, that when set, causes the encoding service/system 106 (e.g., encoder 116 and/or decoder 118) to utilize the functionality discussed herein, for example, to enter a particular mode from a plurality of modes, In certain examples, a mode includes one or more modes for different respective "reference picture identification code" formats (e.g., as in FIGS. 4-6) and/or different compound prediction modes (e.g., as in FIGS. 7-9). In certain example, the one or more modes are used in a live (e.g., and video-on-demand) application.

In certain example, the decoder 118 includes one or more machine learning (e.g., prediction) models 112, e.g., used to generate a prediction that a reference frame is a (e.g., best) candidate reference frame.

The depicted content delivery service/system 102 includes a content data store 104, which may be implemented in one or more data centers. In one example, the media file (e.g., video file that is to be viewed by the viewer device 122) is accessed (for example, from the content data store 104 or directly from a content provider 136, e.g., as a live stream) by encoder 116 (e.g., by media file (e.g., fragment) generator thereof). In certain examples, the content delivery service/system 102 includes a video intake service(s) 138 to intake a video, e.g., from content provider(s) 136.

In certain examples, the (e.g., client) viewer device 122 requesting the media file (e.g., fragment(s) of media) from content delivery service/system 102 causes the encoder 116 to encode the video file, e.g., into a compressed format for transmittal on network(s) 110 to viewer device 122. In one example, a media file generator of encoder 116 generates one or more subsets (e.g., frames, fragments, segments, scenes, etc.) of the media file (e.g., video), e.g., beginning with accessing the media file and generating the requested media (e.g., fragment(s)). In one example, each fragment includes a plurality of video frames.

In FIG. 1, content delivery service/system 102 is coupled to viewer device 122 and user device 130 via one or more networks 120, e.g., a cellular data network or a wired or wireless local area network (WLAN).

In certain examples, content delivery service/system 102 (e.g., encoding service/system 106 thereof) is to send a query asking for the selection of a mode (e.g., one or more of a plurality of different respective "reference picture identification code" formats (e.g., as in FIGS. 4-6) and/or different compound prediction modes (e.g., as in FIGS. 7-9)) is desired) to user (e.g., operator) device 130, for example, and the user device 130 (e.g., in response to a command from a user of the device 130) is to send a response (e.g., an indication of that mode 114). Depicted user device 130 includes a display 132 having a graphical user interface (GUI) 134, e.g., to display a query for encoding service/system 106 to enter (or not) a particular mode 114, e.g., one or more of a plurality of different respective "reference picture identification code" formats (e.g., as in FIGS. 4-6) and/or different compound prediction modes (e.g., as in FIGS. 7-9).

Depicted viewer device 122 (e.g., where the viewer is a customer of user (e.g., operator) of device 130) includes a media player 124 having a decoder 126 (e.g., separate from decoder 118 of encoding service/system 106) to decode the media file (e.g., fragment) from the content delivery service/system 102, e.g., to display video and/or audio of the media file on display and/or audio output 128, respectively. In certain examples, the decoder 126 (e.g., as code and/or hardware) includes a reference (e.g., decoded) picture buffer 126A. In certain examples, the decoder 126 receives an indication (e.g., a syntax element in a bitstream) of (e.g., in) the media file (for example, within a header thereof the media file, e.g., a sequence and/or picture header for that encoded media) of the type of identification code and/or the number of the reference slots (e.g., reference frames in the reference picture list) which may be used for compound mode. In certain examples, any encoder and/or decoder (e.g., the decoder 126) is to have knowledge of the format of the "reference picture identification code" used, e.g., as discussed in reference to FIGS. 4-6. In certain examples, the decoder 126 is to decode the encoded frame (e.g., picture) based on (i) the already decoded (e.g., reference) frames in its reference (e.g., decoded) picture buffer 126A and (ii) an identification code of the reference frames for use in the decoding of the current frame (e.g., and the format of the "reference picture identification code"). In certain examples, the decoded current frame is then played by the media player 124, e.g., displayed on the display 128.

Figure 2:
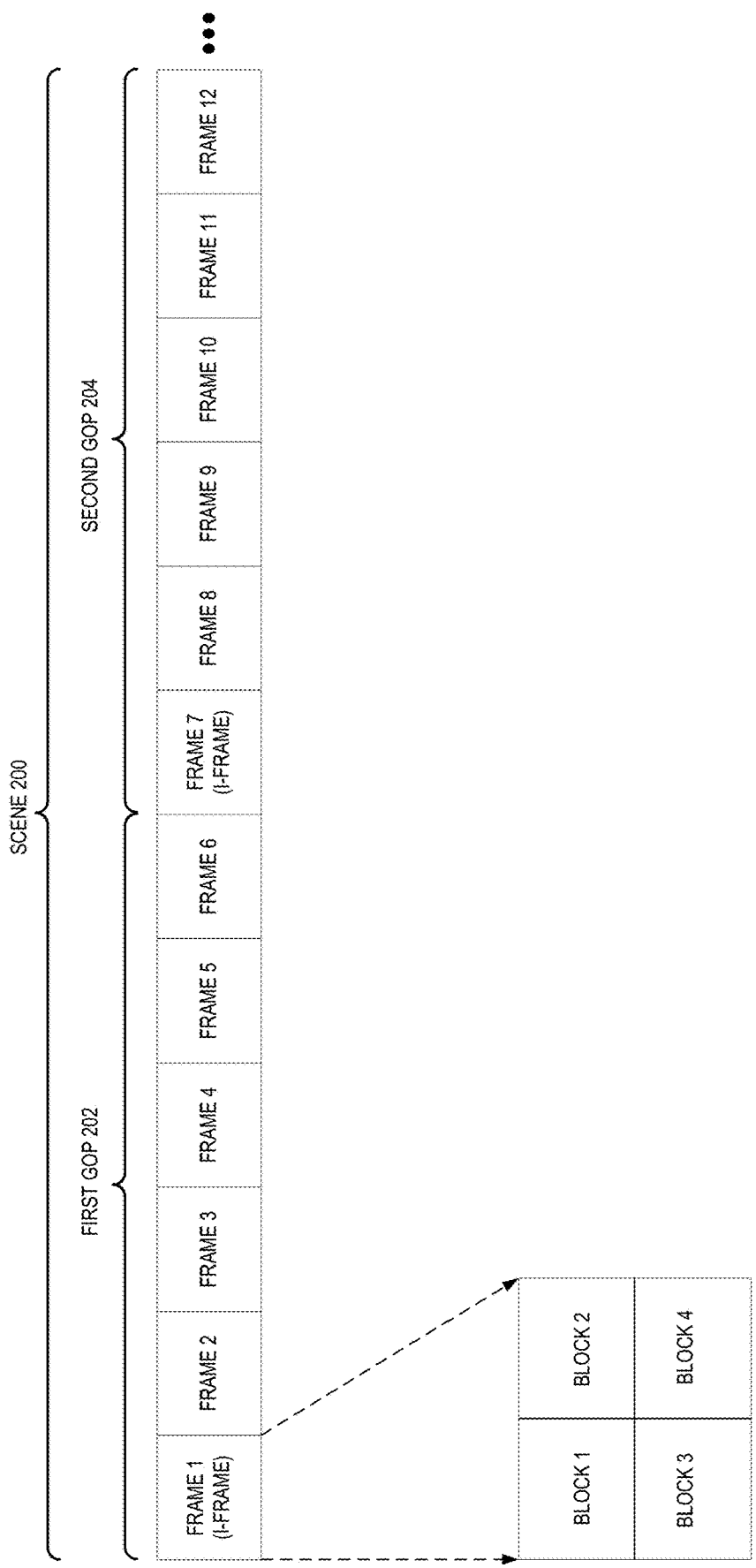
FIG. 2 is a diagram illustrating a scene having a plurality of groups of pictures, and a frame formed from a plurality of blocks (e.g., macroblocks) according to some examples.

FIG. 2 is a diagram illustrating a scene 200 having a plurality of groups of pictures 202, 204, and a frame (frame 1) formed from a plurality of blocks (blocks 1-4) (e.g., macroblocks) according to some examples. The number of scenes, GOPs (frames therein), and blocks are merely examples, e.g., it should be understood that any number of scenes, GOPs (frames therein), and blocks may be utilized.

In some examples, a macroblock is a proper subset of pixels of a frame used as the basic processing unit of the video encoding/decoding. An example macroblock is a (e.g., 16×16) block of luma samples and two corresponding blocks of chroma samples. A macroblock can be further partitioned. In one example, the selection of the size of inter prediction partitions (e.g., as an encoding mode) is a result of a trade-off between the coding gain provided by using motion compensation with smaller blocks and the quantity of data needed to represent the data for motion compensation. The inter prediction process can form segmentations for motion representation that as smaller than a macroblock, e.g., as small as 4×4 luma samples in size, using motion vector accuracy of one-quarter of the luma sample grid spacing displacement. The process for inter prediction of a sample block can also involve the selection of the picture to be used as the reference picture from a number of stored previously-decoded pictures (e.g., reference frame(s) 110 in FIG. 1)). In certain examples, motion vectors are encoded differentially with respect to predicted values formed from nearby encoded motion vectors. In one example, an encoder calculates appropriate motion vectors and other data elements represented in the video data stream. This motion estimation process in the encoder and/or the selection of whether to use inter prediction for the representation of each region of the video content may be signaled in a bitstream as specified by a video coding standard.

Figure 3:
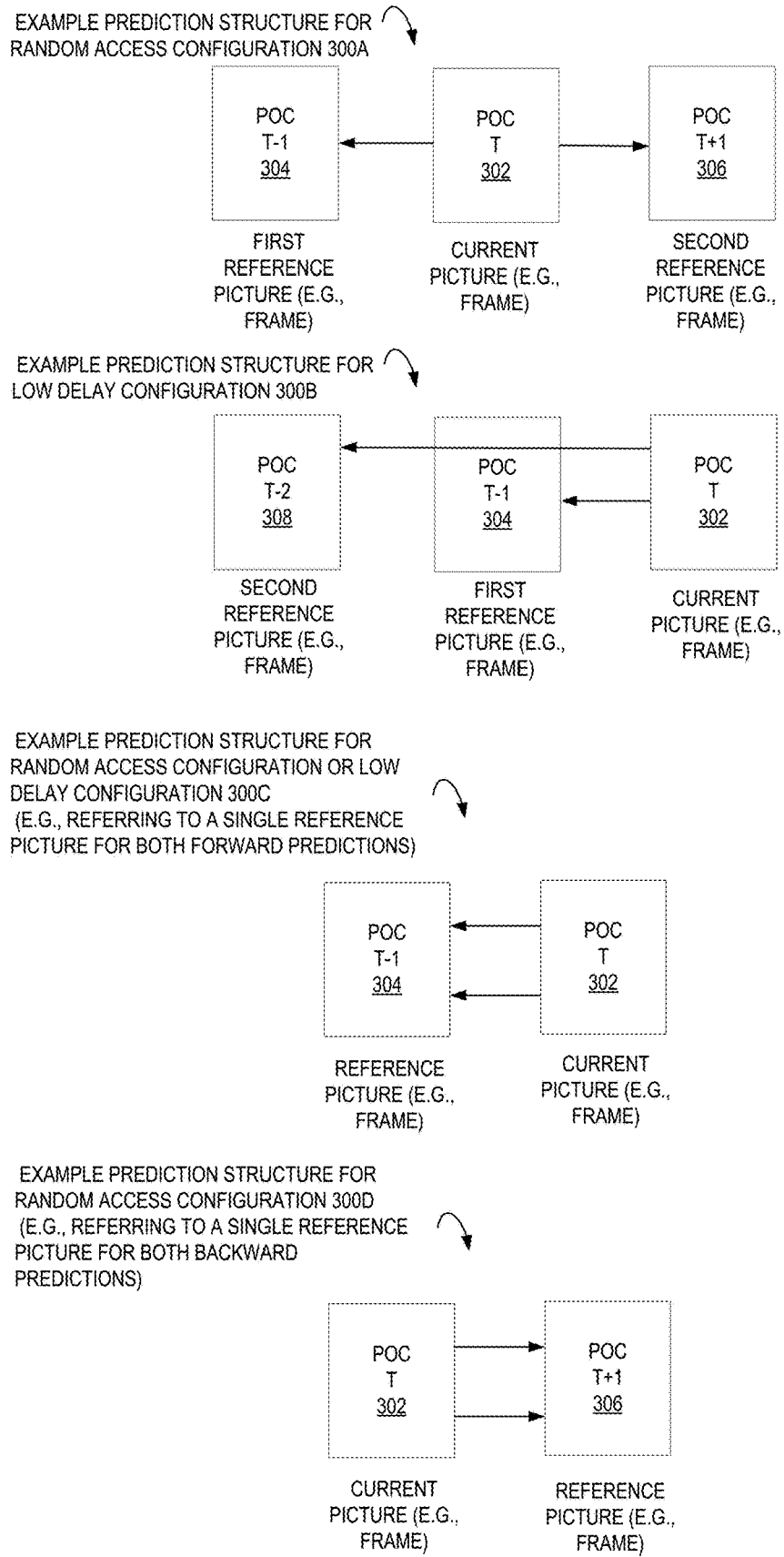
FIG. 3 is a diagram illustrating three different prediction structures according to some examples.

FIG. 3 is a diagram illustrating three different prediction structures 300A, 300B, and 300C (e.g., used by encoding service/system 106 to predict which reference frames to use in an encoding for a frame that is based at least in part on those reference frames) according to some examples. In certain examples, "compound mode" (e.g., which refers to the two reference frames for motion compensation) is used for inter prediction, but certain encoding services/systems (e.g., codecs thereof) disallow both predictions to refer to the same reference frame (e.g., same index to a same reference slot). However, the hit-ratio of the first reference in the reference picture buffer (e.g., list) is expected to be high for low latency coding, allowing both predictions of the compound mode to refer to the same reference slot improves compression efficiency without devoting two slots to the same reference picture.

FIG. 3 shows a comparison of selected pairs of reference pictures for a compound prediction mode. For example, with prediction structure 300A being used for a random access (RA) configuration (e.g., indicating reference frames before and after the current (e.g., input) frame in video order (e.g., picture order count (POC)). Depicted prediction structure 300A illustrates current (e.g., input) frame 302 (at POC time t) that includes a forward reference to frame 304 (at POC time t−1) and a backward reference to frame 306 (at POC time t+1). For example, with prediction structure 300B being used for a low delay (LD) configuration (e.g., indicating only reference frames before the current (e.g., input) frame in video order (e.g., picture order count (POC)). Depicted prediction structure 300B illustrates current (e.g., input) frame 302 (at POC time t) that includes a first forward reference to frame 304 (at POC time t−1) and a second forward reference to frame 308 (at POC time t−2). However, in certain examples, encoding services/systems (e.g., codecs thereof) disallow both backward (or both forward) predictions to refer to the same reference frame (e.g., same index to a same reference slot). For example, with prediction structure 300C being used for a random access (RA) configuration or a low delay (LD) configuration (e.g., indicating a single reference frame before the current (e.g., input) frame in video order (e.g., in picture order count (POC)), for example, to generate a "forward" prediction from frame 304 to current frame 302. Depicted prediction structure 300C illustrates current (e.g., input) frame 302 (at POC time t) that includes a first reference to frame 304 (at POC time t−1) and also a second reference to frame 304 (at POC time t−1). For example, with prediction structure 300D being used for a random access (RA) configuration (e.g., indicating a single reference frame after the current (e.g., input) frame in video order (e.g., in picture order count (POC)), for example, to generate a prediction from frame 306 to current frame 302. Depicted prediction structure 300D illustrates current (e.g., input) frame 302 (at POC time t) that includes a first reference to frame 306 (at POC time t+1) and also a second reference to frame 306 (at POC time t+1).

Examples herein provide encoding services/systems (e.g., codecs thereof) that allow both predictions of a compound mode to refer to the same reference frame (e.g., same index to a same reference slot). In certain examples, while the RA configuration refers to the pictures most frequently used for compound prediction mode, the LD configuration forces one to select a relatively long-distant decoded picture as the second reference picture. In certain examples herein, the compound prediction mode (e.g., for RA configuration or LD configuration) refers to the nearest reference picture. In certain examples, an encoding services/systems (e.g., codecs thereof) only allows a pair of reference frames for a single input frame, e.g., only (i) a forward and backward pair, (ii) both backward, or (iii) both forward.

Figure 4:
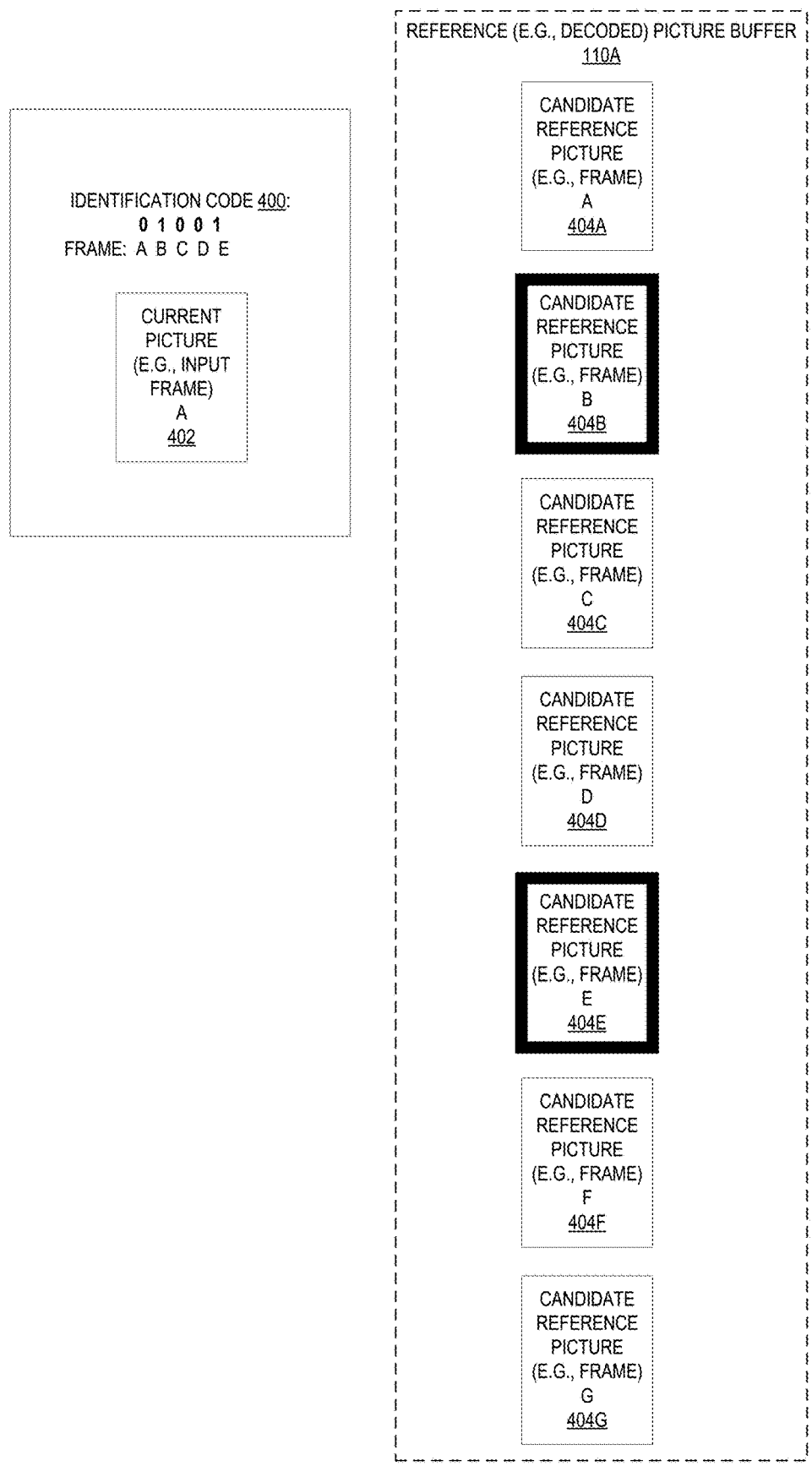
FIG. 4 is a diagram illustrating a first reference picture identification code format and candidate reference pictures (e.g., frames) according to some examples.
Figure 5:
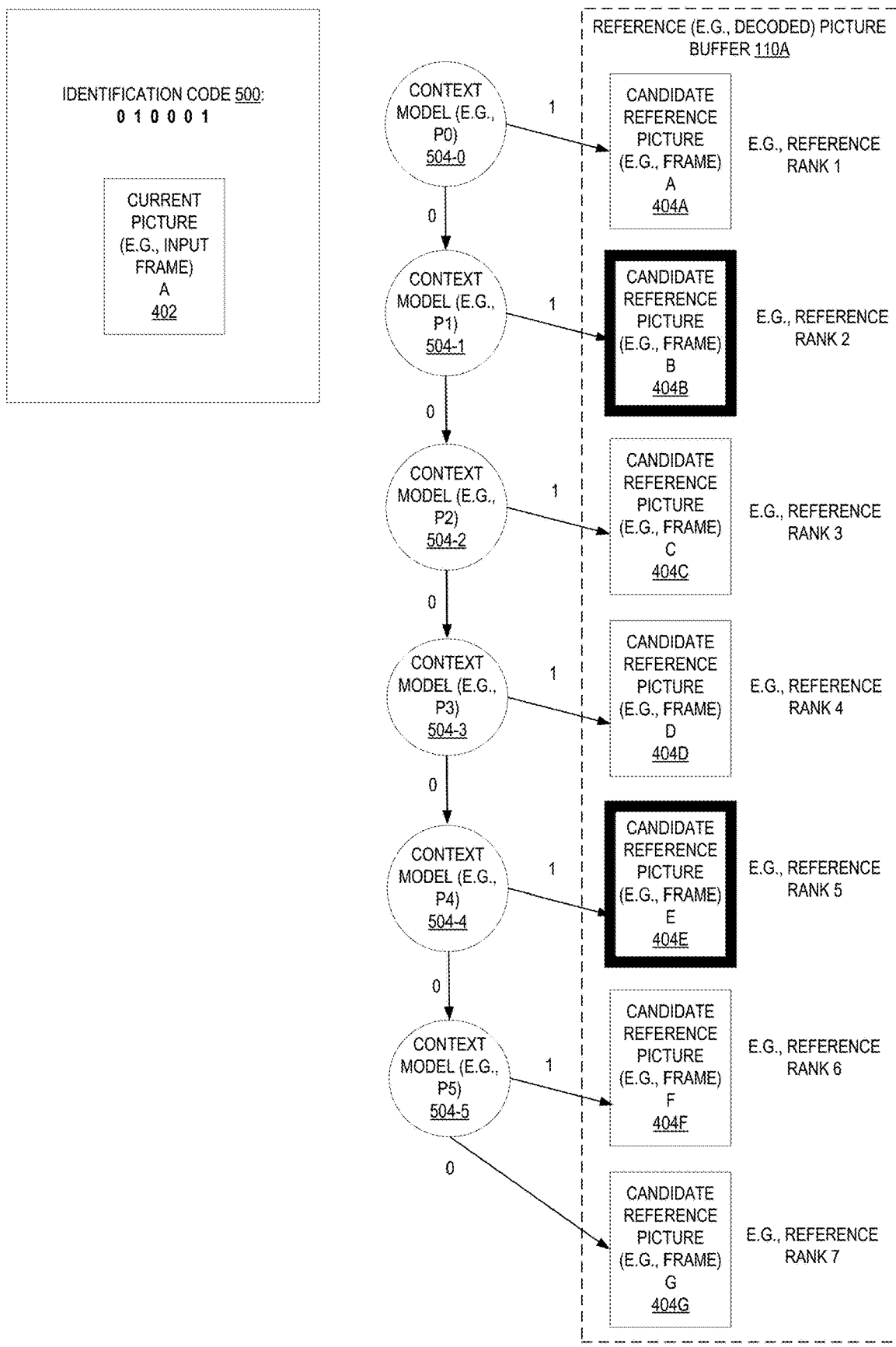
FIG. 5 is a diagram illustrating a second reference picture identification code format with an example referring to two different reference pictures, candidate reference pictures (e.g., frames), and a context tree according to some examples.

Although FIGS. 4-6 show seven candidate reference pictures (e.g., frames), it should be understood that other number of candidate reference pictures may be utilized in certain examples.

FIG. 4 is a diagram illustrating a first reference picture identification code format 400 (shown with an example value of 01001 to indicate the reference frames) and candidate reference pictures (e.g., frames) 404A-404G according to some examples. In certain examples (e.g., if reference picture buffer includes candidate reference pictures 404A-404G), and encoding services/systems (e.g., codecs thereof) determine that candidate reference picture (e.g., frame) "B" 404B and candidate reference picture (e.g., frame) "E" 404E are the two best candidates (shown here as a bolded outline) to be reference frames (e.g., exceeding a probability threshold for a respective probability generated by machine learning (e.g., prediction) model 112)), the corresponding identification code 400 (e.g., so that encoder 116 can utilize those frames in its encoding of input frame 402 (e.g., as an instance of input frame 108 in FIG. 1)) is 0 [for frame 404A], 1 [for frame 404B], 0 [for frame 404C], 0 [for frame 404D], and 1 [for frame 404E], (optionally, 0 [for frame 404F] and 0 [for frame 404G]), for example, where a "1" indicates a candidate reference picture (e.g., frame) is to be used as the reference frame in the encoding and a "0" indicates that candidate reference picture (e.g., frame) is not to be used as a reference frame in the encoding.

However, such a format of a reference picture identification code restricts referring to the same slot, e.g., for compound mode. Certain examples herein utilize a format of a reference picture identification code that permits referring to the same slot, e.g., for compound mode. For example, where instead of the value of 01001 (as shown in FIG. 4) to indicate that candidate frames "B" (e.g., slot/index 2 where frame "A" starts at slot/index 1) and "E" (e.g., slot/index 5) are the reference frames, the value of 010001 (as shown in FIG. 5) to indicate that candidate frames "B" (e.g., slot/index 2 where frame "A" starts at slot/index 1) and "E" (e.g., slot/index 5) are the reference frames. Certain examples herein utilize a format (e.g., as shown in FIGS. 5 and 6) that when a bit of the identification code for a first candidate reference frame is set to the first bit value to indicate the first candidate reference frame is a reference frame (e.g., one of a forward reference frame and a backward reference frame) for the input frame, an immediately following bit of the identification code being set to the first bit value indicates the first candidate reference frame is to be used again as a reference frame (e.g., as another instance of the forward reference frame in certain examples and as another instance of the backward reference frame in other examples) for the input frame. For example, where the value of 011 (as shown in FIG. 6) to indicate that candidate frame "B" (e.g., slot/index 2 where frame "A" starts at slot/index 1) is to be used as the reference frames (e.g., as both references for the compound mode).

In certain examples, the input frame (e.g., input frame 402) is a decoded version of an encoded frame. In certain examples, the (e.g., decoded) input picture (e.g., input frame 402) is compared with reference pictures in encoding, for example, once the best reference is selected for each block in the input picture, the reference index is signaled (e.g., via a corresponding identification code) and delivered to the decoder (e.g., decoder 126 in FIG. 1). In certain example, the decoder (e.g., decoder 126 in FIG. 1) identifies which reference picture is used for each block from the reference index (e.g., via the corresponding identification code). In certain examples, two different reference indices are separately signaled by two different identification codes. In certain examples, two different reference indices are jointly signaled by one identification code.

FIG. 5 is a diagram illustrating a second reference picture identification code format 500 (shown with an example value of 010001 to indicate the reference frames) with an example referring to two different reference pictures, candidate reference pictures (e.g., frames) 404A-404G, and a context tree 504 according to some examples. In certain examples (e.g., if reference picture buffer includes candidate reference pictures 404A-404G), and encoding services/systems (e.g., codecs thereof) determine that candidate reference picture (e.g., frame) "B" 404B and candidate reference picture (e.g., frame) "E" 404E are the two best candidates (shown here as a bolded outline) to be reference frames (e.g., exceeding a probability threshold for a respective probability generated by machine learning (e.g., prediction) model 112)), the corresponding identification code 500 (e.g., so that encoder 116 can utilize those frames in its encoding of input frame 402 (e.g., as an instance of input frame 108 in FIG. 1)) is 0 [for frame 404A], 1 [for frame 404B], 0 [also for frame 404B, e.g., to indicate it is not to be used twice as a reference frame], 0 [for frame 404C], 0 [for frame 404D], and 1 [for frame 404E], (optionally, 0 [for frame 404F] and 0 [for frame 404G]), for example, where each initial "1" indicates a candidate reference picture (e.g., frame) is to be used as a first reference frame in the encoding, an immediately next "1", after a "1", indicating that same candidate reference picture (e.g., frame) is to be used as another reference frame in the encoding, and an immediately next "0", after a "1", indicating that same candidate reference picture (e.g., frame) is not to be used as another reference frame in the encoding.

Context tree includes a first context model 504-0 (e.g., generating a probability P0 that frame 404A is a reference frame for the current (e.g., input) frame 402), a second context model 504-1 (e.g., generating a probability P1 that frame 404B is a reference frame for the current (e.g., input) frame 402), a third context model 504-2 (e.g., generating a probability P2 that frame 404C is a reference frame for the current (e.g., input) frame 402), a fourth context model 504-3 (e.g., generating a probability P3 that frame 404D is a reference frame for the current (e.g., input) frame 402), a fifth context model 504-4 (e.g., generating a probability P4 that frame 404E is a reference frame for the current (e.g., input) frame 402), and a sixth context model 504-5 (e.g., generating a probability P5 that frame 404F (and/or 404G) is a reference frame for the current (e.g., input) frame 402). In FIG. 5, numbers are shown next to each path on the context tree to illustrate the path that an identification code indicates, e.g., such that consecutive first (e.g., "1") values indicate a picture (e.g., frame) (e.g., slot of buffer 110A) is to be used twice as a reference frame for current (e.g., input) frame 402 (e.g., picture).

In certain examples, the formats shown in FIGS. 5 and 6 are a single format, e.g., such that FIG. 5 shows an example without consecutive first (e.g., "1") values (e.g., such that the corresponding frame is to not to be used twice as a reference frame for a single encoding of the current (e.g., input) frame 402) and FIG. 6 shows an example with consecutive first (e.g., "1") values (e.g., such that the corresponding frame is to be used twice as a reference frame for a single encoding of the current (e.g., input) frame 402).

FIG. 6 is a diagram illustrating a second reference picture identification code format 600 (shown with an example value of 011 to indicate multiple references to the single reference frame) with an example with multiple references to the same reference picture (e.g., frame) 402, candidate reference pictures (e.g., frames) 404A-404G, and a context tree according to some examples. In certain examples (e.g., if reference picture buffer includes candidate reference pictures 404A-404G), and encoding services/systems (e.g., codecs thereof) determine that candidate reference picture (e.g., frame) "B" 404B is the best candidate (shown here as a bolded outline) to be both (e.g., only both forward (e.g., as in configuration 300C in FIG. 3) or only both backward (e.g., as in configuration 300D in FIG. 3)) reference frames (e.g., exceeding a probability threshold for a respective probability generated by machine learning (e.g., prediction) model 112)), the corresponding identification code 600 (e.g., so that encoder 116 can utilize that frame (e.g., twice) in its encoding of input frame 402 (e.g., as an instance of input frame 108 in FIG. 1)) is 0 [for frame 404A], 1 [for frame 404B], and 1 [also for frame 404B, e.g., to indicate it is to be used twice as a reference frame], (optionally 0 [for frame 404C], 0 [for frame 404D], 0 [for frame 404E], 0 [for frame 404F], and 0 [for frame 404G]), for example, where each initial "1" indicates a candidate reference picture (e.g., frame) is to be used as a first reference frame in the encoding, an immediately next "1", after a "1", indicating that same candidate reference picture (e.g., frame) is to be used as another reference frame in the encoding, and an immediately next "0", after a "1", indicating that same candidate reference picture (e.g., frame) is not to be used as another reference frame in the encoding.

In certain examples, different formats are used for different proper subsets of an identification code. For example, with a first proper subset of an identification code being in the first or second format and a second proper subset of that identification code being in a different (e.g., the other of the first or second) format.

In certain examples, the number of the reference slots (e.g., reference frames in the reference picture list), which may be used for compound mode as the same reference frame, is determined by a syntax element (e.g., num_same_ref_compound mode) (for example, header, e.g., sequence and/or picture header) which may be signaled in a high-level syntax structure (e.g., sequence or picture header). In certain examples, when the value of num_same_ref_compound_mode is equal to a value (e.g., 3), the first value of (e.g., 3) reference slots can be used as the same reference frame for compound mode, while other reference slots cannot be used as the same reference frame for compound mode. For example, in an example when the num_same_ref_compound_mode is set to 3, the candidate reference pictures (e.g., frames) 404A-404C in FIG. 6 can be used as the same reference frame for compound mode by signaling the identification code formats, 11, 011 or 0011. However, in certain examples, the following reference pictures (e.g., frames) 404D-404G in FIG. 6 cannot be used as the same reference frames for compound mode. Therefore, in certain examples, the identification code format 00011 indicates that the reference frame 404D and the reference frame 404E in FIG. 6 are used as two reference frames for the compound mode, because the case that the reference frame 404D is selected as the same reference frame is skipped.

In certain examples, when a bit of an identification code for a first candidate reference frame is set to a first bit value (e.g., 1) to indicate the first candidate reference frame is a reference frame for an input frame, an immediately following bit of the identification code being set to a corresponding value (e.g., to "0" in some examples and to "1" in other examples) indicates the first candidate reference frame is also another reference frame for the input frame.

Context tree includes a first context model 504-0 (e.g., generating a probability P0 that frame 404A is a reference frame for the current (e.g., input) frame 402), a second context model 504-1 (e.g., generating a probability P1 that frame 404B is a reference frame for the current (e.g., input) frame 402), a third context model 504-2 (e.g., generating a probability P2 that frame 404C is a reference frame for the current (e.g., input) frame 402), a fourth context model 504-3 (e.g., generating a probability P3 that frame 404D is a reference frame for the current (e.g., input) frame 402), a fifth context model 504-4 (e.g., generating a probability P4 that frame 404E is a reference frame for the current (e.g., input) frame 402), and a sixth context model 504-5 (e.g., generating a probability P5 that frame 404F (and/or 404G) is a reference frame for the current (e.g., input) frame 402). In FIG. 6, numbers are shown next to each path on the context tree to illustrate the path that an identification code indicates, e.g., such that consecutive first (e.g., "1") values indicate a picture (e.g., frame) (e.g., slot of buffer 110A) is to be used twice as a reference frame for current (e.g., input) frame 402 (e.g., picture).

In certain examples, to add this functionality (e.g., allowing for the use of the same reference picture, and thus corresponding picture signaling, as both references for a current frame that is to be encoded in compound mode) (e.g., the using the formats 500-600) to an encoding service/system 106, a (e.g., compile time) flag (e.g., CONFIG_AL-LOW_SAME_REF_COMPOUND) is included to indicate the functionality is enabled when set (e.g., and not when cleared).

In certain examples, the strategy of buffering decoded pictures is basically "first-in, first-out" like a queue or sliding window. Even if some key pictures (e.g., random access intra pictures) can be stored longer than other pictures, in certain examples the temporally nearest (e.g., according to the POC) decoded pictures are used as reference pictures for encoding and/or decoding the current picture. For example, in low delay configuration, the coded picture with the picture order count (POC) equal to t may refer to the decoded pictures with POC equal to t−1, t−2, t−3, as reference pictures for motion compensation, sequentially. In certain examples, when the reference picture buffer's size (e.g., the number of buffer slots) for storing decoded pictures is limited and/or fixed, the long-distant decoded picture cannot be referenced because those pictures will be bumped out of the buffer before referencing. In certain examples, there are constraints on constructing the order of reference pictures in the list, so that it consumes more bits to indicate the long-distant reference pictures. In certain examples, the forward and the backward references are listed in a same (e.g., unified) reference picture list, e.g., where the format of the reference picture identification code (e.g., as shown in FIG. 4) does not allow the forward and backward reference to be to the same slot.

FIG. 7 is a diagram illustrating a first example of a reference picture indication for compound prediction mode according to some examples. FIG. 7 illustrates a reference picture list (shown with example pictures (e.g., frames) POC 23-18 in reference (e.g., decoded) picture buffer 110A). In certain examples, input picture POC 24 (e.g., frame 402) is compared to each of the candidate reference pictures POC 23-18. In certain examples, by disallowing the forward and the backward references being the same picture (e.g., frame), there is a strong constraint that the forward reference picture should be closer than the backward reference picture, e.g., in low-delay configuration. In certain examples, the reference (e.g., decoded) picture buffer management and signaling mechanism with the above constraints limits the flexibility of reference picture list construction, because it cannot fully utilize the benefit of the hierarchical prediction structure. For example, in FIG. 7, when, for input picture POC 24 (e.g., frame 402), the best reference picture for forward (e.g., L0) reference is POC 22 and the best reference picture for backward (e.g., L1) reference is POC 18, assuming 1 bit is needed to indicate whether the nearest candidate in the reference picture list is the current reference or not, this would consume three bits (the value of 24 from POC 24 minus the value of 21 from POC 21) for forward (e.g., L0) reference indication and three bits (the value of 21 from POC 21 minus the value of 18 from POC 18) for backward reference (e.g., L1) indication, so totally 6 bits are consumed to represent the reference picture indication, e.g., for compound prediction mode. To give more flexibility in construction of reference picture lists per picture and to enable efficient signaling of reference picture indication per block, the following improvements are disclosed.

In certain examples, the reference pictures in the original reference picture list, e.g., which is implicitly derived by a predefined process, are reordered, e.g., by an explicit signaling or another predefined implicit derivation process. In certain examples, when an active number of reference pictures is signaled per picture or tile, only the reference pictures firstly located in the reordered list are used as active reference pictures, e.g., according to a signaled number of active reference pictures. In certain examples, when a maximum number of reference pictures is determined in sequence level, each picture may have a different number of active reference pictures (e.g., which is equal to or smaller than the maximum number).

In certain examples herein, there are one or more methods to signal the combinations of two reference pictures. For example, one is signaling two reference picture indices separately, but sharing the same reference picture list. Another is constructing the valid combination list and signaling an index indicating a valid combination among candidates (e.g., as shown in FIGS. 4-6).

In certain examples, e.g., for more efficient signaling, the unified reference picture list can be separated and reorganized into two or more lists. For example, when multiple different reference picture list reorganization processes are predefined. In certain examples, a process for forward referencing and another process for backward referencing can be selected, e.g., in sequence, picture, slice or tile level. In certain examples, the reorganization process is predefined or explicitly signaled, e.g., in sequence level or picture level. An example is that all possible candidates of the reorganization processes are listed in sequence level, and then each picture (or slice or tile) chooses one or more among the listed candidates. In certain examples, when the reorganization processes are explicitly signaled, the number of multiple active reference pictures are signaled. In certain examples, each reference list includes the reference pictures that were signaled as active reference pictures. In certain examples, for explicit signaling of orders, the indices that specify which reference pictures of the unified list are included in the new list are signaled. In certain examples, once multiple reference picture lists are constructed, one list is assigned to forward prediction and another list is assigned to backward prediction, for example, by using a predefined rule, by interpreting neighboring coding information (e.g., quantization value), or by parsing a signaled information in the bitstream.

FIG. 8 is a diagram illustrating a second example of a reference picture indication for compound prediction mode according to some examples. FIG. 8 illustrates two separate reference picture lists, e.g., selected from pictures (e.g., frames) POC 23-18 in reference (e.g., decoded) picture buffer 110A. FIG. 8 shows an example of separate and adaptive reference picture indications for compound prediction mode. In FIG. 8, two (e.g., an L0 and an L1) reference picture lists are constructed with different orders and active reference pictures. For example, using the same example discussed in reference to FIG. 7, the reference picture indication only consumes four bits to indicate the compound prediction mode using two reference pictures with POC 21, for example, consuming one bit to indicate POC 21 (the value of 24 from POC 24 minus the value of 21 from POC 21 when it is in the first slot of reference picture list 0) for forward (e.g., L0) reference indication and three bits (the value of 21 from POC 21 minus the value of 18 from POC 18) for backward reference (e.g., L1) indication, so totally 4 bits are consumed to represent the reference picture indication, e.g., using separate reference picture lists for compound prediction mode.

In certain examples herein, compression efficiency is improved by allowing compound prediction from the same reference picture, e.g., for both skip mode and other normal motion vector prediction modes. In certain examples for skip mode, the reference index can be implicitly derived from neighboring candidates or explicitly determined by selecting the first one or two candidate reference pictures in the reordered reference picture list as skip mode reference pictures.

In certain examples herein, each reference picture list (e.g., selected as a proper subset of pictures from a reference picture buffer) can have a priority, e.g., which is predefined or explicitly selected and signaled. In certain examples, for efficient signaling and discarding duplicated cases, there is a rule that the temporal distance of the first reference picture in a list shall be equal to or smaller than the temporal distance of the second reference picture in another list. This constraint can save bits to indicate the second reference picture by discarding the cases that the temporal distance of the second reference picture is smaller than that of the first reference picture. This constraint can be applied to both a unified reference picture list or multiple separated reference picture lists.

FIG. 9 is a diagram illustrating a third example of a reference picture indication for compound prediction mode according to some examples. In FIG. 9, when the reference picture with POC equal to 21 is selected from the first list (reference picture list 0), then POC23 and POC22 can be removed from the second list (reference picture list 1), e.g., by a predefined rule or an explicitly selected and signaled information. In certain examples, then, without signaling of the reference picture in the second list, POC18 can be selected as the second reference picture. In this case, only 1 bit is needed to indicate the compound prediction mode with POC21 and POC18, e.g., using separate reference picture lists for compound prediction mode with the discarding of unavailable combinations in signaling.

Figure 10:
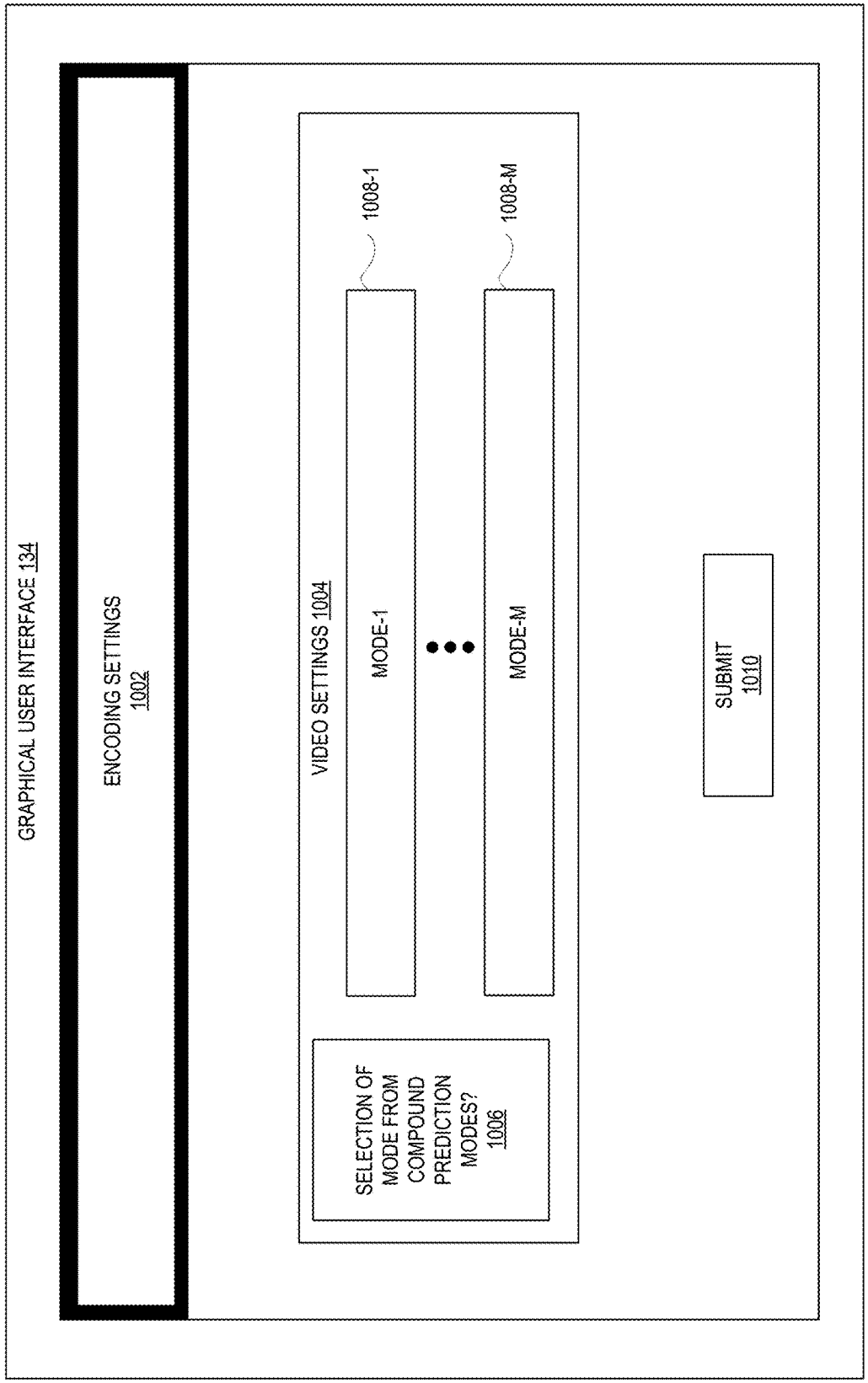
FIG. 10 is a diagram illustrating a graphical user interface for setting a content delivery service/system/service to a mode of a plurality of compound prediction modes (e.g., a corresponding reference picture identification code format) according to some examples.

FIG. 10 is a diagram illustrating a graphical user interface 134 for setting a content delivery service/system/service to a mode of a plurality of compound prediction modes (e.g., a corresponding reference picture identification code format) according to some examples. Depicted graphical user interface 134 includes a field 1002 that is customizable with text to indicate that these are encoding settings, a field 1004 that is customizable with text to indicate that these are video settings, a field 1006 that is customizable with text to indicate to select a mode from compound prediction modes, selectable fields 1008-1 to M (e.g., where M is a positive integer greater than 1) that are customizable with text to indicate a mode of a plurality of 1 to M (e.g., compound prediction) modes (e.g., a corresponding reference picture identification code format), and an interface element 1010 that, when selected, will cause the content delivery service/system/service to enter the selected mode. A user may click the submit interface element 1010 to cause (e.g., cause a command to be sent that causes) entry of a content delivery service/system/service into the indicate mode 1008. An interface element, may include, but is not limited to, a thumbs up (or down), checkbox, button, dropdown menu, etc.

Figure 11:
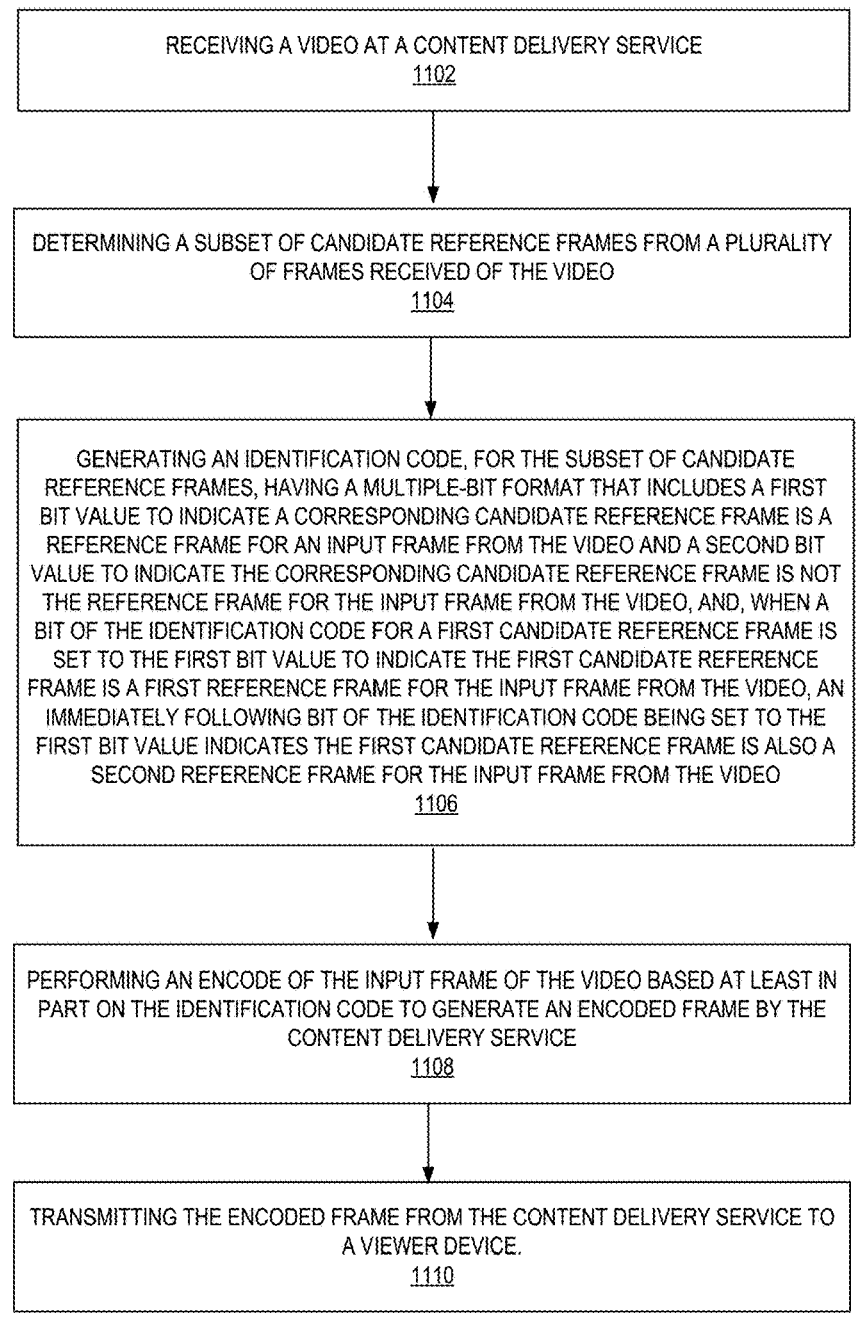
FIG. 11 is a flow diagram illustrating operations of a method for encoding a video according to some examples.

FIG. 11 is a flow diagram illustrating operations 1100 of a method for encoding a video according to some examples. Some or all of the operations 1100 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1100 are performed by content delivery service/system/service 102 (or a component thereof) of the other figures.

The operations 1100 include, at block 1102, receiving a video at a content delivery service. The operations 1100 further include, at block 1104, determining a subset of candidate reference frames from a plurality of frames received of the video. The operations 1100 further include, at block 1106, generating an identification code, for the subset of candidate reference frames, having a multiple-bit format that includes a first bit value to indicate a corresponding candidate reference frame is a reference frame for an input frame from the video and a second bit value to indicate the corresponding candidate reference frame is not the reference frame for the input frame from the video, and, when a bit of the identification code for a first candidate reference frame is set to the first bit value to indicate the first candidate reference frame is a first reference frame for the input frame from the video, an immediately following bit of the identification code being set to the first bit value indicates the first candidate reference frame is also a second reference frame for the input frame from the video. The operations 1100 further include, at block 1108, performing an encode of the input frame of the video based at least in part on the identification code to generate an encoded frame by the content delivery service. The operations 1100 further include, at block 1110, transmitting the encoded frame from the content delivery service to a viewer device.

At least some examples of the disclosed technologies can be described in view of the following examples:

Example 1. A computer-implemented method comprising:
  receiving a live video at a content delivery service;
  determining a subset of candidate reference frames from a plurality of frames received of the live video;
  generating an identification code, for the subset of candidate reference frames, having a multiple-bit format that includes a first bit value to indicate a corresponding candidate reference frame is a reference frame for an input frame from the live video and a second bit value to indicate the corresponding candidate reference frame is not the reference frame for the input frame from the live video, and, when a bit of the identification code for a first candidate reference frame is set to the first bit value to indicate the first candidate reference frame is one of a forward reference frame and a backward reference frame for the input frame from the live video, an immediately following bit of the identification code being set to the first bit value indicates the first candidate reference frame is also another of the of the forward reference frame and the backward reference frame for the input frame from the live video;
  performing a real time encode of the input frame of the live video based at least in part on the identification code to generate an encoded frame by the content delivery service; and
  transmitting the encoded frame from the content delivery service to a viewer device.

Example 2. The computer-implemented method of example 1, wherein, when the bit of the identification code of the multiple-bit format for the first candidate reference frame is set to the first bit value to indicate the first candidate reference frame is the one of the forward reference frame and the backward reference frame for the input frame from the live video, the immediately following bit of the identification code being set to the second bit value indicates the first candidate reference frame is not the another of the one of the forward reference frame and the backward reference frame for the input frame from the live video.

Example 3. The computer-implemented method of example 2, wherein, when the bit of the identification code of the multiple-bit format for the first candidate reference frame is set to the first bit value to indicate the first candidate reference frame is the one of the forward reference frame and the backward reference frame for the input frame from the live video, and the immediately following bit of the identification code is set to the second bit value to indicate the first candidate reference frame is not the another of the one of the forward reference frame and the backward reference frame for the input frame from the live video, a next bit of the identification code being set to the first bit value indicates a second candidate reference frame is the another of the one of the forward reference frame and the backward reference frame for the input frame from the live video.

Example 4. A computer-implemented method comprising:
receiving a video at a content delivery service;
determining a subset of candidate reference frames from a plurality of frames received of the video;
generating an identification code, for the subset of candidate reference frames, having a multiple-bit format that includes a first bit value to indicate a corresponding candidate reference frame is a reference frame for an input frame from the video and a second bit value to indicate the corresponding candidate reference frame is not the reference frame for the input frame from the video, and, when a bit of the identification code for a first candidate reference frame is set to the first bit value to indicate the first candidate reference frame is a first reference frame for the input frame from the video, an immediately following bit of the identification code being set to the first bit value indicates the first candidate reference frame is also a second reference frame for the input frame from the video;
performing an encode of the input frame of the video based at least in part on the identification code to generate an encoded frame by the content delivery service; and
transmitting the encoded frame from the content delivery service to a viewer device.

Example 5. The computer-implemented method of example 4, wherein, when the bit of the identification code of the multiple-bit format for the first candidate reference frame is set to the first bit value to indicate the first candidate reference frame is the first reference frame for the input frame from the video, the immediately following bit of the identification code being set to the second bit value indicates the first candidate reference frame is not another reference frame for the input frame from the video.

Example 6. The computer-implemented method of example 5, wherein, when the bit of the identification code of the multiple-bit format for the first candidate reference frame is set to the first bit value to indicate the first candidate reference frame is the first reference frame for the input frame from the video, and the immediately following bit of the identification code is set to the second bit value to indicate the first candidate reference frame is not another reference frame for the input frame from the video, a next bit of the identification code being set to the first bit value indicates a second candidate reference frame is the second reference frame for the input frame from the video.

Example 7. The computer-implemented method of example 5, wherein, when the bit of the identification code of the multiple-bit format for the first candidate reference frame is set to the first bit value to indicate the first candidate reference frame is the first reference frame for the input frame from the video, and the immediately following bit of the identification code is set to the second bit value to indicate the first candidate reference frame is not another reference frame for the input frame from the video, a next immediately following bit of the identification code being set to the first bit value indicates a second immediately following candidate reference frame is the second reference frame for the input frame from the video.

Example 8. The computer-implemented method of any one of examples 4-7, wherein a coding standard for the encode only allows two reference frames for the input frame.

Example 9. The computer-implemented method of any one of examples 4-8, wherein the performing the encode comprises a compound prediction for the input frame using the first candidate reference frame as both the first reference frame and the second reference frame.

Example 10. The computer-implemented method of example 9, wherein the compound prediction comprises performing a first prediction on a first block of the first candidate reference frame and a second prediction on a second different block of the first candidate reference frame.

Example 11. The computer-implemented method of any one of examples 4-10, wherein the subset of candidate reference frames are decoded frames from the encode.

Example 12. The computer-implemented method of example 11, wherein the decoded frames are from a decoded frame buffer of an encoder performing the encode.

Example 13. The computer-implemented method of example 11, further comprising replacing at least one of the subset of candidate reference frames with a decoded version of the encoded frame.

Example 14. The computer-implemented method of any one of examples 4-13, wherein the identification code is according to the multiple-bit format when in a first mode, and the identification code is according to a second multiple-bit format when in a second mode, and the second multiple-bit format includes, when a bit of the identification code for the first candidate reference frame is set to the first bit value to indicate the first candidate reference frame is the first reference frame for the input frame from the video, an immediately following bit of the identification code being set to the first bit value indicates a second candidate reference frame is the second reference frame for the input frame from the video.

Example 15. A system comprising:
a video intake service implemented by a one or more electronic devices, the video intake service including instructions that upon execution cause the one or more electronic devices to intake a video; and
a content delivery service implemented by a one or more electronic devices, the content delivery service including instructions that upon execution cause the one or more electronic devices to perform operations comprising:
determining a subset of candidate reference frames from a plurality of frames received of the video,
generating an identification code, for the subset of candidate reference frames, having a multiple-bit format that includes a first bit value to indicate a corresponding candidate reference frame is a reference frame for an input frame from the video and a second bit value to indicate the corresponding candidate reference frame is not the reference frame for the input frame from the video, and, when a bit of the identification code for a first candidate reference frame is set to the first bit value to indicate the first candidate reference frame is a first reference frame for the input frame from the video, an immediately following bit of the identification code being set to the first bit value indicates the first candidate reference frame is also a second reference frame for the input frame from the video, performing an encode of the input frame of the video based at least in part on the identification code to generate an encoded frame by the content delivery service, and transmitting the encoded frame from the content delivery service to a viewer device.

Example 16. The system of example 15, wherein, when the bit of the identification code of the multiple-bit format for the first candidate reference frame is set to the first bit value to indicate the first candidate reference frame is the first reference frame for the input frame from the video, the immediately following bit of the identification code being set to the second bit value indicates the first candidate reference frame is not another reference frame for the input frame from the video.

Example 17. The system of example 16, wherein, when the bit of the identification code of the multiple-bit format for the first candidate reference frame is set to the first bit value to indicate the first candidate reference frame is the first reference frame for the input frame from the video, and the immediately following bit of the identification code is set to the second bit value to indicate the first candidate reference frame is not another reference frame for the input frame from the video, a next bit of the identification code being set to the first bit value indicates a second candidate reference frame is the second reference frame for the input frame from the video.

Example 18. The system of example 15, wherein the performing the encode comprises a compound prediction for the input frame using the first candidate reference frame as both the first reference frame and the second reference frame.

Example 19. The system of example 15, wherein the subset of candidate reference frames are decoded frames from the encode.

Example 20. The system of example 15, wherein the instructions upon execution cause the content delivery service to perform operations further comprising replacing at least one of the subset of candidate reference frames with a decoded version of the encoded frame.

Example 21. The system of any one of examples 15-20, wherein the instructions upon execution cause the content delivery service to perform operations further comprising reading an (e.g., header) element of the video to determine a number of candidate reference frames which are allowed to be used as a same reference frame (e.g., for a compound prediction).

Example 22. The computer-implemented method of any one of examples 1-14, further comprising reading an (e.g., header) element of the video to determine a number of candidate reference frames which are allowed to be used as a same reference frame (e.g., for a compound prediction).

Example 23. A computer-implemented method comprising:

receiving a bitstream of a video by a media player;

decoding a plurality of frames received in the bitstream by a decoder of the media player; determining a subset of candidate reference frames from the plurality of decoded frames received in the bitstream by the media player;

receiving an identification code in the bitstream by the media player, for the subset of candidate reference frames, having a multiple-bit format that includes a first bit value to indicate a corresponding candidate reference frame is a reference frame for an input frame from the video and a second bit value to indicate the corresponding candidate reference frame is not the reference frame for the input frame from the video, and, when a bit of the identification code for a first candidate reference frame is set to the first bit value to indicate the first candidate reference frame is a first reference frame for the input frame from the video, an immediately following bit of the identification code being set to the first bit value indicates the first candidate reference frame is also a second reference frame for the input frame from the video;

decoding the bitstream based at least in part on the identification code by the decoder of the media player to generate a decoded frame; and displaying the decoded frame on a display coupled to the media player.

Example 24. The computer-implemented method of example 23, wherein, when the bit of the identification code of the multiple-bit format for the first candidate reference frame is set to the first bit value to indicate the first candidate reference frame is the first reference frame for the decoded frame from the video, the immediately following bit of the identification code being set to the second bit value indicates the first candidate reference frame is not another reference frame for the decoded frame.

Example 25. The computer-implemented method of example 24, wherein, when the bit of the identification code of the multiple-bit format for the first candidate reference frame is set to the first bit value to indicate the first candidate reference frame is the first reference frame for the decoded frame from the video, and the immediately following bit of the identification code is set to the second bit value to indicate the first candidate reference frame is not another reference frame for the decoded frame, a next bit of the identification code being set to the first bit value indicates a second candidate reference frame is the second reference frame for the decoded frame.

Example 26. The computer-implemented method of example 23, wherein the decoding the bitstream to generate the decoded frame comprises a compound prediction using the first candidate reference frame as both the first reference frame and the second reference frame.

Example 27. The computer-implemented method of example 23, wherein the first candidate reference frame is from a decoded frame buffer of the decoder of the media player performing the decode.

Example 28. The computer-implemented method of example 23, wherein the identification code is according to the multiple-bit format when in a first mode, and the identification code is according to a second multiple-bit format when in a second mode, and the second multiple-bit format includes, when a bit of the identification code for the first candidate reference frame is set to the first bit value to indicate the first candidate reference frame is the first reference frame for the decoded frame, an immediately following bit of the identification code being set to the first bit value indicates a second candidate reference frame is the second reference frame for the decoded frame.

Exemplary environments, systems, etc. that the above may be used in are detailed below.

Figure 12:
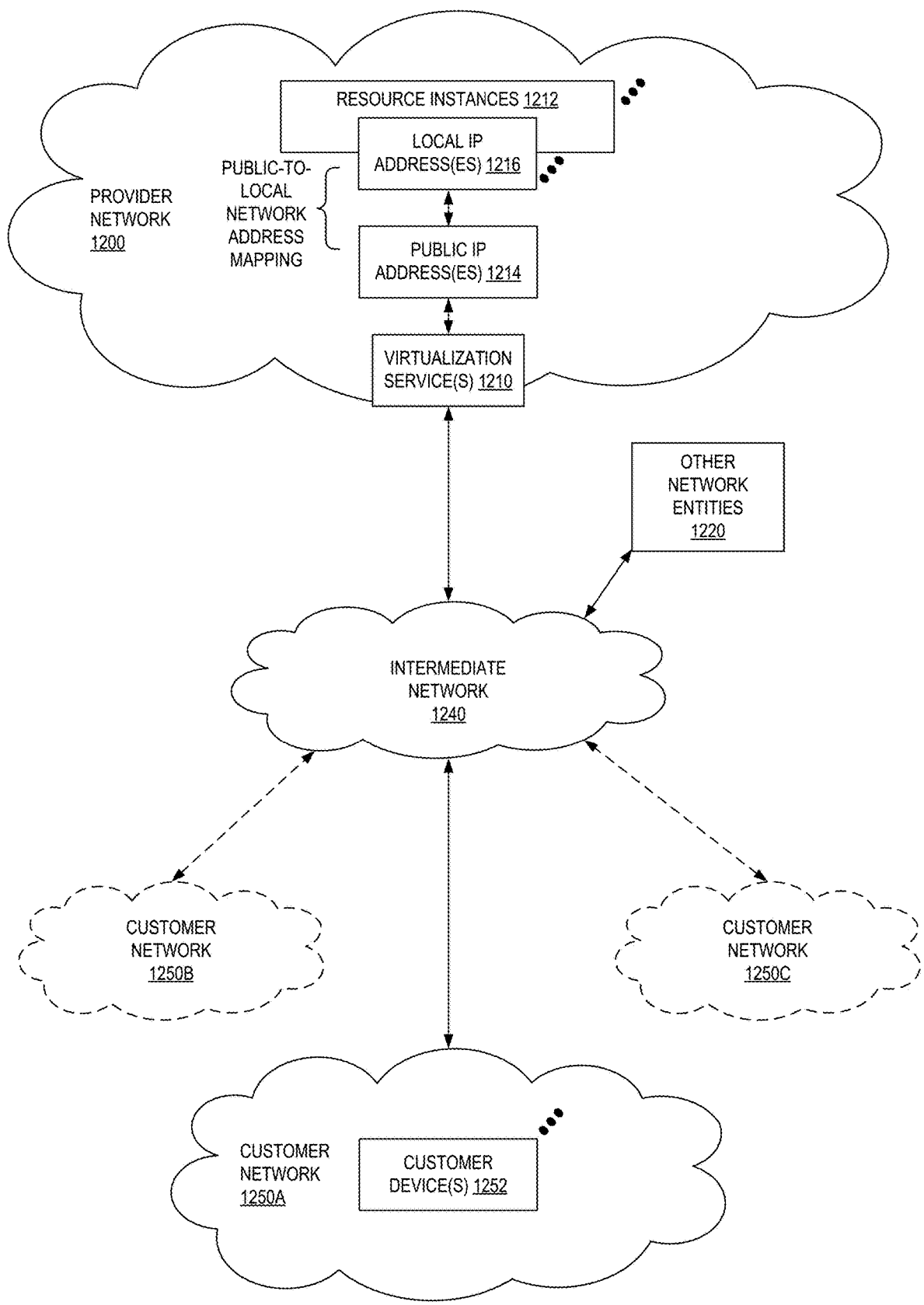
FIG. 12 illustrates an example provider network environment according to some examples.

FIG. 12 illustrates an example provider network (or "service provider system") environment according to some examples. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some examples, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
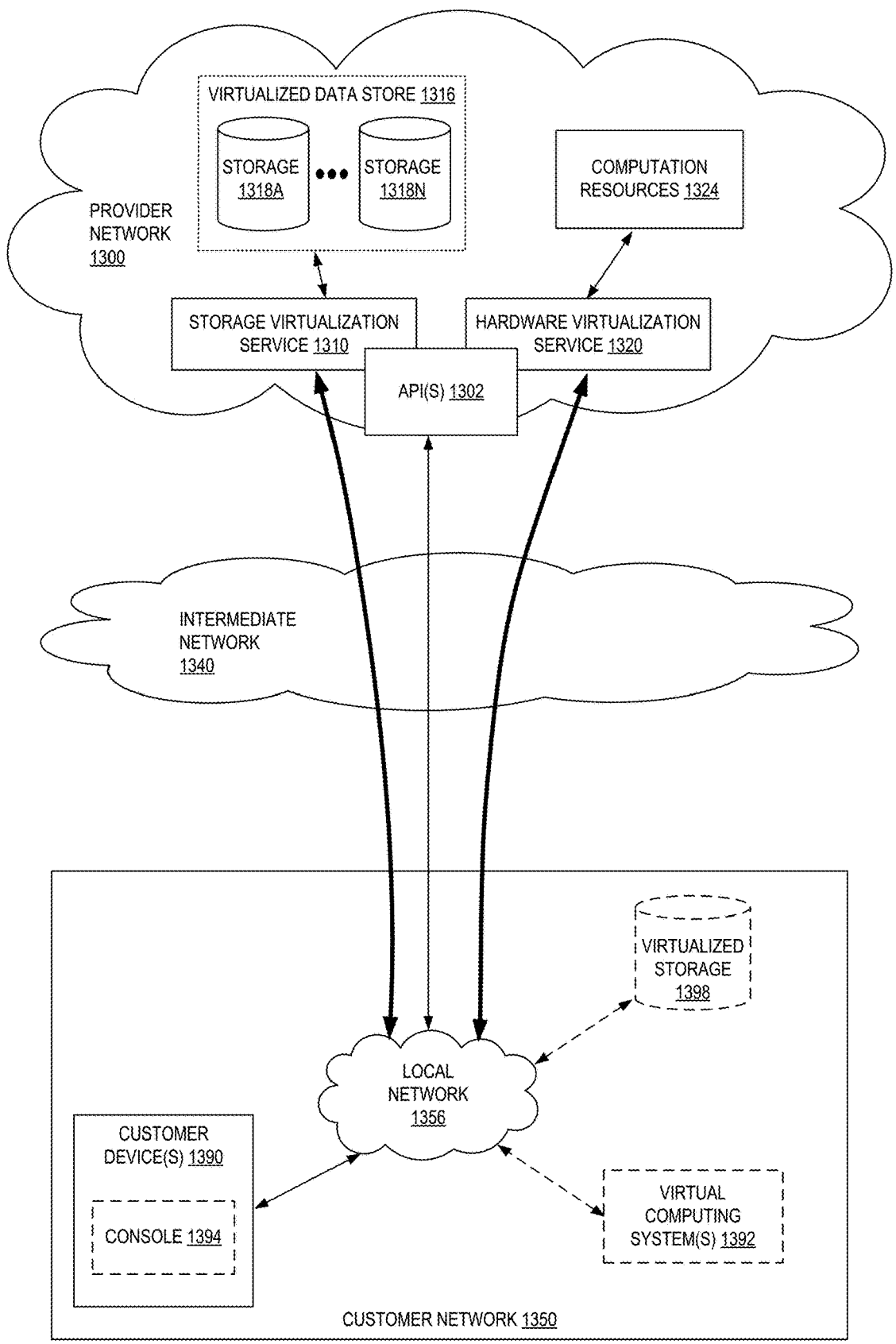
FIG. 13 is a block diagram of an example provider network that provides a storage service and a hardware virtualization service to customers according to some examples.

FIG. 13 is a block diagram of an example provider network that provides a storage service and a hardware virtualization service to customers, according to some examples. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some examples, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some examples, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some examples, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some examples, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Illustrative System

Figure 14:
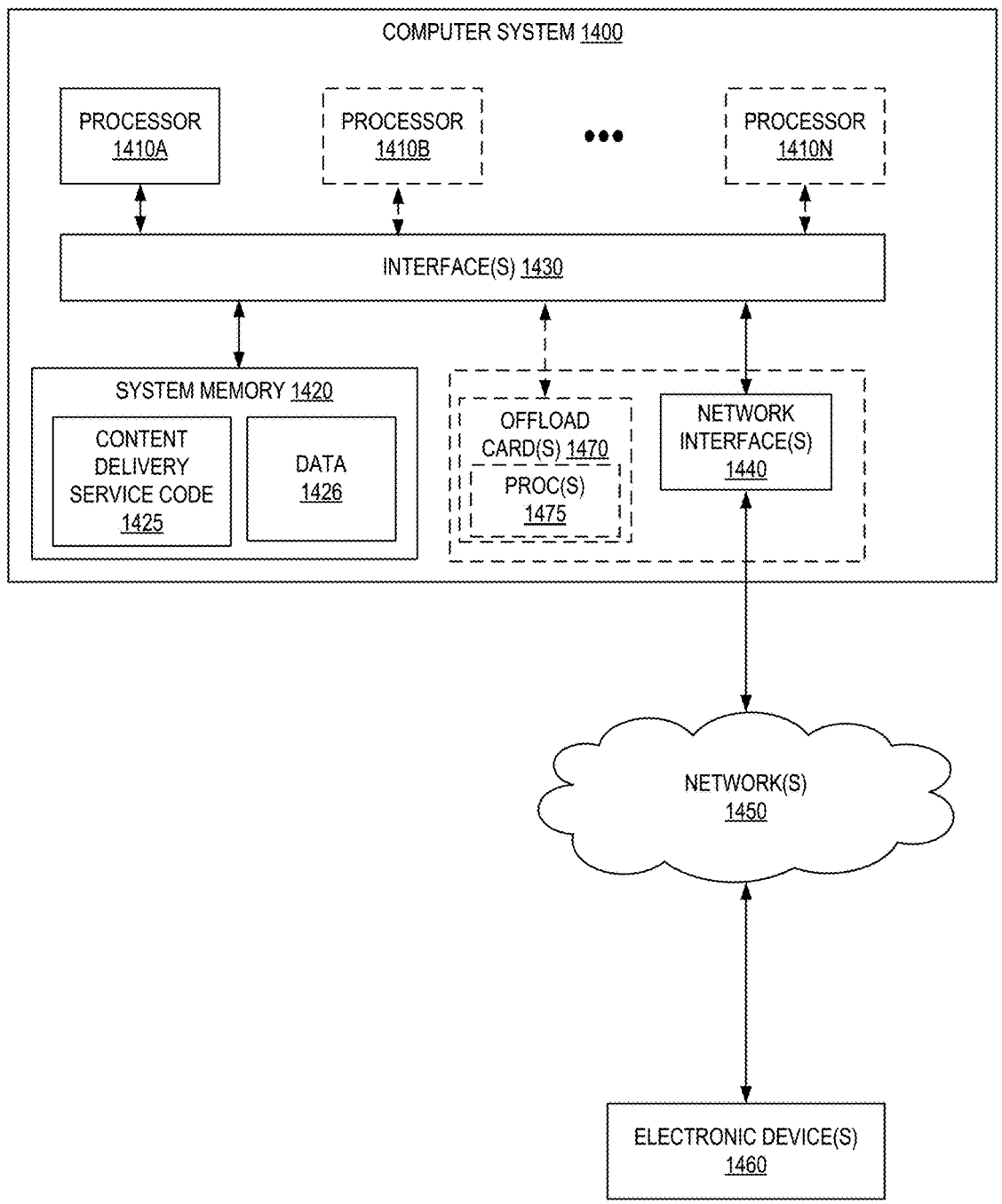
FIG. 14 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1400 illustrated in FIG. 14. In the illustrated example, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various examples a computer system 1400 may include one computing device or any number of computing devices configured to work together as a single computer system 1400.

In various examples, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various examples, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various examples, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1420 as content delivery service code 1425 (e.g., executable to implement, in whole or in part, the content delivery service 102) and data 1426.

In one example, I/O interface 1430 may be configured to coordinate I/O traffic between processor 1410, system memory 1420, and any peripheral devices in the device, including network interface 1440 or other peripheral interfaces. In some examples, I/O interface 1430 may perform any necessary protocol, timing, or other data transformations to convert data signals from one component (e.g., system memory 1420) into a format suitable for use by another component (e.g., processor 1410). In some examples, I/O interface 1430 may include support for devices attached through various types of peripheral buses, such as a variant of the Peripheral Component Interconnect (PCI) bus standard or the Universal Serial Bus (USB) standard, for example. In some examples, the function of I/O interface 1430 may be split into two or more separate components, such as a north bridge and a south bridge, for example. Also, in some examples some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various examples, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some examples the offload card(s) 1470 can perform compute instance management operations such as pausing and/or un-pausing compute instances, launching and/or terminating compute instances, performing memory transfer/copying operations, etc. These management operations may, in some examples, be performed by the offload card(s) 1470 in coordination with a hypervisor (e.g., upon a request from a hypervisor) that is executed by the other processors 1410A-1410N of the computer system 1400. However, in some examples the virtualization manager implemented by the offload card(s) 1470 can accommodate requests from other entities (e.g., from compute instances themselves), and may not coordinate with (or service) any separate hypervisor.

In some examples, system memory 1420 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Figure 15:
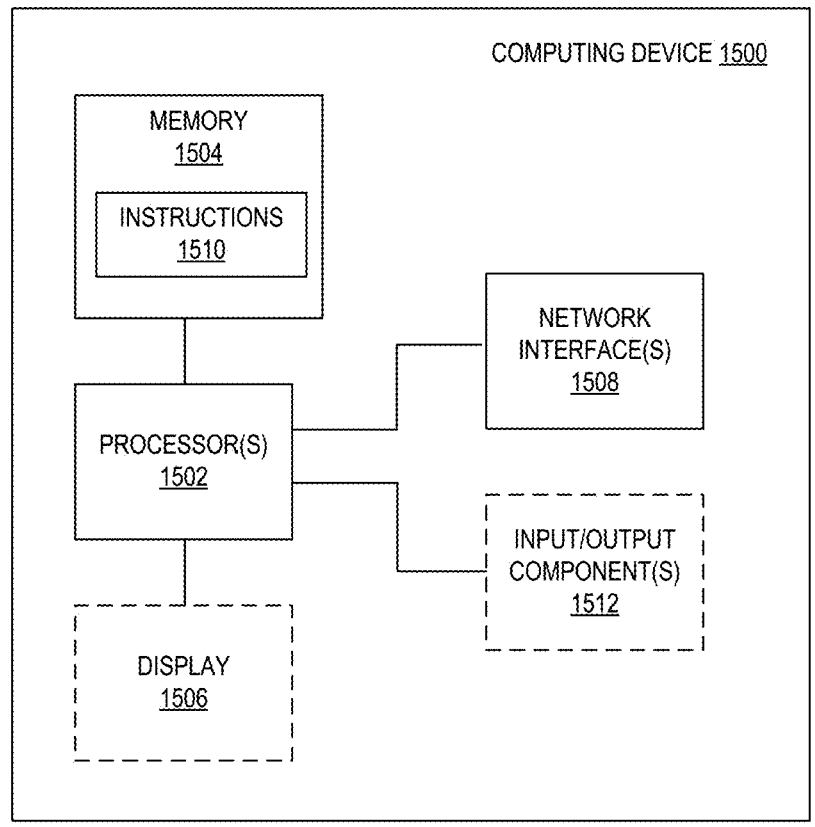
FIG. 15 illustrates a logical arrangement of a set of general components of an exemplary computing device that can be utilized in accordance with various examples.

FIG. 15 illustrates a logical arrangement of a set of general components of an example computing device 1500. Generally, a computing device 1500 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1502 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1504) to store code (for example, instructions 1510, e.g., which implement a content delivery service as disclosed herein), and a set of one or more wired or wireless network interfaces 1508 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1504) of a given electronic device typically stores code (e.g., instructions 1510) for execution on the set of one or more processors 1502 of that electronic device. One or more parts of various examples may be implemented using different combinations of software, firmware, and/or hardware.

A computing device 1500 can include some type of display element 1506, such as a touch screen or liquid crystal display (LCD), although many devices such as portable media players might convey information via other means, such as through audio speakers, and other types of devices such as server end stations may not have a display element 1506 at all. As discussed, some computing devices used in some examples include at least one input and/or output component(s) 1512 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 16:
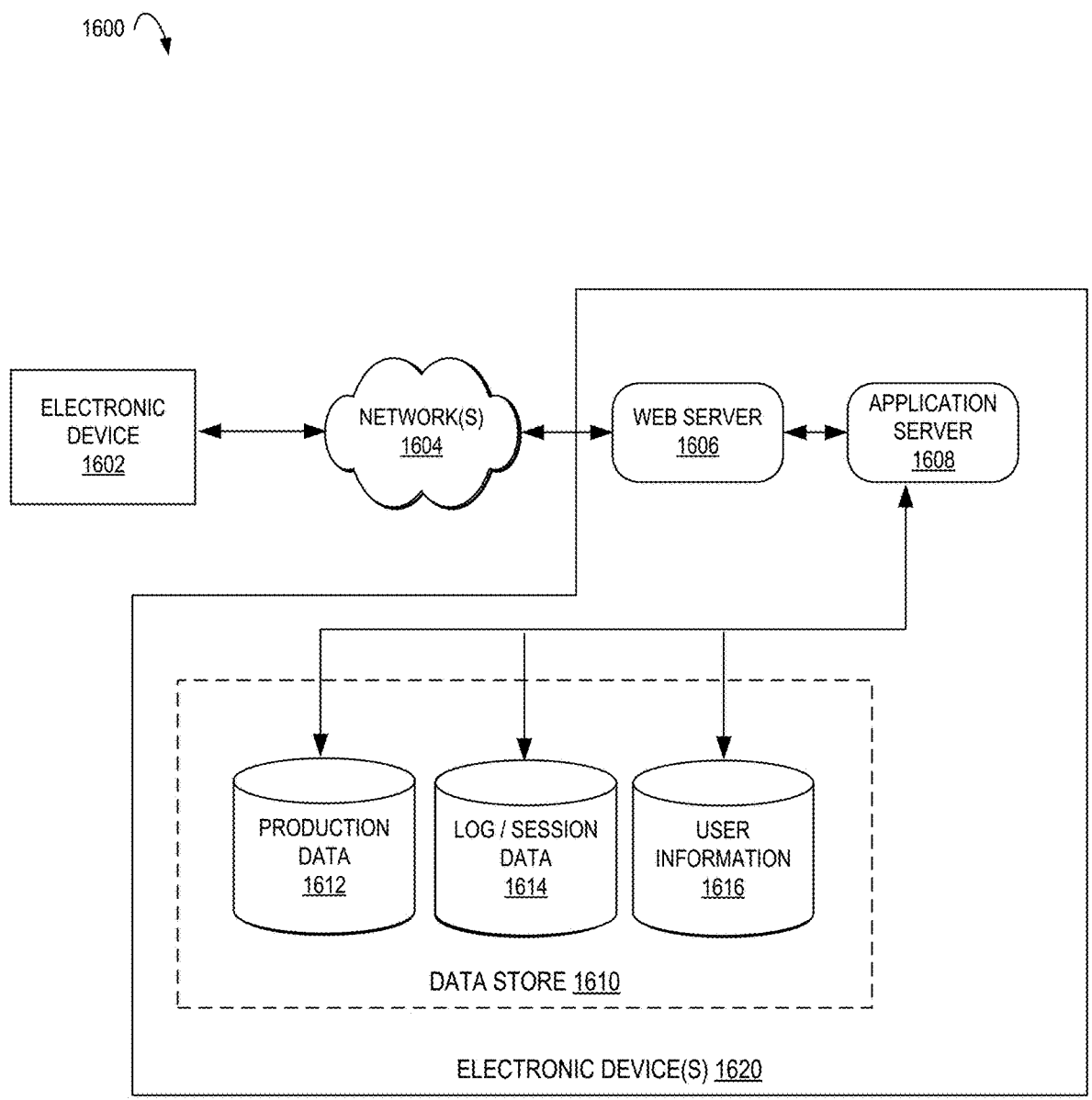
FIG. 16 illustrates an example of an environment for implementing aspects in accordance with various examples.

As discussed, different approaches can be implemented in various environments in accordance with the described examples. For example, FIG. 16 illustrates an example of an environment 1600 for implementing aspects in accordance with various examples. For example, in some examples messages are HyperText Transfer Protocol (HTTP) requests that are received by a web server (e.g., web server 1606), and the users, via electronic devices, may interact with the provider network via a web portal provided via the web server 1606 and application server 1608. As will be appreciated, although a web-based environment is used for purposes of explanation, different environments may be used, as appropriate, to implement various examples. The system includes an electronic client device 1602, which may also be referred to as a client device and can be any appropriate device operable to send and receive requests, messages, or information over an appropriate network 1604 and convey information back to a user of the device 1602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1604 includes the Internet, as the environment includes a web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device 1602 and handling a majority of the data access and business logic for an application. The application server 1608 provides access control services in cooperation with the data store 1610 and is able to generate content such as text, graphics, audio, video, etc., to be transferred to the client device 1602, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1602 and the application server 1608, can be handled by the web server 1606. It should be understood that the web server 1606 and application server 1608 are not required and are merely example components, as structured code discussed herein can be executed on any appropriate device or host machine as discussed elsewhere herein.

The data store 1610 can include several separate data tables, databases, or other data storage mechanisms and media for storing data relating to a particular aspect. For example, the data store illustrated includes mechanisms for storing production data 1612 and user information 1616, which can be used to serve content for the production side. The data store 1610 also is shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. In one example, a user might submit a search request for a certain type of item. In this case, the data store 1610 might access the user information 1616 to verify the identity of the user and can access a production data 1612 to obtain information about items of that type. The information can then be returned to the user, such as in a listing of results on a web page that the user is able to view via a browser on the user device 1602. Information for a particular item of interest can be viewed in a dedicated page or window of the browser.

The web server 1606, application server 1608, and/or data store 1610 may be implemented by one or more electronic devices 1620, which can also be referred to as electronic server devices or server end stations, and may or may not be located in different geographic locations. Each of the one or more electronic devices 1620 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the environment 1600 in FIG. 16 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PUP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1318A-1318N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a live video at a content delivery service;
   determining a subset of candidate reference frames from a plurality of frames received of the live video;
   generating an identification code, for the subset of candidate reference frames, having a multiple-bit format that includes a first bit value to indicate a corresponding candidate reference frame is a reference frame for an input frame from the live video and a second bit value to indicate the corresponding candidate reference frame is not the reference frame for the input frame from the live video, and, when a bit of the identification code for a first candidate reference frame is set to the first bit value to indicate the first candidate reference frame is one of a forward reference frame and a backward reference frame for the input frame from the live video, an immediately following bit of the identification code being set to the first bit value indicates the first candidate reference frame is also another of the one of the forward reference frame and the backward reference frame for the input frame from the live video;
   performing a real time encode of the input frame of the live video based at least in part on the identification code to generate an encoded frame by the content delivery service; and
   transmitting the encoded frame from the content delivery service to a viewer device.

2. The computer-implemented method of claim 1, wherein, when the bit of the identification code of the multiple-bit format for the first candidate reference frame is set to the first bit value to indicate the first candidate reference frame is the one of the forward reference frame and the backward reference frame for the input frame from the live video, the immediately following bit of the identification code being set to the second bit value indicates the first candidate reference frame is not the another of the one of the forward reference frame and the backward reference frame for the input frame from the live video.

3. The computer-implemented method of claim 2, wherein, when the bit of the identification code of the multiple-bit format for the first candidate reference frame is set to the first bit value to indicate the first candidate reference frame is the one of the forward reference frame and the backward reference frame for the input frame from the live video, and the immediately following bit of the identification code is set to the second bit value to indicate the first candidate reference frame is not the another of the one of the forward reference frame and the backward reference frame for the input frame from the live video, a next bit of the identification code being set to the first bit value indicates a second candidate reference frame is the another of the one of the forward reference frame and the backward reference frame for the input frame from the live video.

4. A computer-implemented method comprising:
receiving a video at a content delivery service;
determining a subset of candidate reference frames from a plurality of frames received of the video;
generating an identification code, for the subset of candidate reference frames, having a multiple-bit format that includes a first bit value to indicate a corresponding candidate reference frame is a reference frame for an input frame from the video and a second bit value to indicate the corresponding candidate reference frame is not the reference frame for the input frame from the video, and, when a bit of the identification code for a first candidate reference frame is set to the first bit value to indicate the first candidate reference frame is a first reference frame for the input frame from the video, an immediately following bit of the identification code being set to the first bit value indicates the first candidate reference frame is also a second reference frame for the input frame from the video;
performing an encode of the input frame of the video based at least in part on the identification code to generate an encoded frame by the content delivery service; and
transmitting the encoded frame from the content delivery service to a viewer device.

5. The computer-implemented method of claim 4, wherein, when the bit of the identification code of the multiple-bit format for the first candidate reference frame is set to the first bit value to indicate the first candidate reference frame is the first reference frame for the input frame from the video, the immediately following bit of the identification code being set to the second bit value indicates the first candidate reference frame is not another reference frame for the input frame from the video.

6. The computer-implemented method of claim 5, wherein, when the bit of the identification code of the multiple-bit format for the first candidate reference frame is set to the first bit value to indicate the first candidate reference frame is the first reference frame for the input frame from the video, and the immediately following bit of the identification code is set to the second bit value to indicate the first candidate reference frame is not another reference frame for the input frame from the video, a next bit of the identification code being set to the first bit value indicates a second candidate reference frame is the second reference frame for the input frame from the video.

7. The computer-implemented method of claim 5, wherein, when the bit of the identification code of the multiple-bit format for the first candidate reference frame is set to the first bit value to indicate the first candidate reference frame is the first reference frame for the input frame from the video, and the immediately following bit of the identification code is set to the second bit value to indicate the first candidate reference frame is not another reference frame for the input frame from the video, a next immediately following bit of the identification code being set to the first bit value indicates a second immediately following candidate reference frame is the second reference frame for the input frame from the video.

8. The computer-implemented method of claim 4, wherein a coding standard for the encode only allows two reference frames for the input frame.

9. The computer-implemented method of claim 4, wherein the performing the encode comprises a compound prediction for the input frame using the first candidate reference frame as both the first reference frame and the second reference frame.

10. The computer-implemented method of claim 9, wherein the compound prediction comprises performing a first prediction on a first block of the first candidate reference frame and a second prediction on a second different block of the first candidate reference frame.

11. The computer-implemented method of claim 9, further comprising reading a header of the video to determine a number of candidate reference frames which are allowed to be used as a same reference frame for the compound prediction.

12. The computer-implemented method of claim 4, wherein the subset of candidate reference frames are decoded frames from the encode.

13. The computer-implemented method of claim 12, wherein the decoded frames are from a decoded frame buffer of an encoder performing the encode.

14. The computer-implemented method of claim 12, further comprising replacing at least one of the subset of candidate reference frames with a decoded version of the encoded frame.

15. The computer-implemented method of claim 4, wherein the identification code is according to the multiple-bit format when in a first mode, and the identification code is according to a second multiple-bit format when in a second mode, and the second multiple-bit format includes, when a bit of the identification code for the first candidate reference frame is set to the first bit value to indicate the first candidate reference frame is the first reference frame for the input frame from the video, an immediately following bit of the identification code being set to the first bit value indicates a second candidate reference frame is the second reference frame for the input frame from the video.

16. A computer-implemented method comprising:
receiving a bitstream of a video by a media player;
decoding a plurality of frames received in the bitstream by a decoder of the media player;
determining a subset of candidate reference frames from the plurality of decoded frames received in the bitstream by the media player;
receiving an identification code in the bitstream by the media player, for the subset of candidate reference frames, having a multiple-bit format that includes a first bit value to indicate a corresponding candidate reference frame is a reference frame for an input frame from the video and a second bit value to indicate the corresponding candidate reference frame is not the reference frame for the input frame from the video, and, when a bit of the identification code for a first candidate reference frame is set to the first bit value to indicate the first candidate reference frame is a first reference frame for the input frame from the video, an immediately following bit of the identification code being set to the first bit value indicates the first candidate reference frame is also a second reference frame for the input frame from the video;

decoding the bitstream based at least in part on the identification code by the decoder of the media player to generate a decoded frame; and displaying the decoded frame on a display coupled to the media player.

17. The computer-implemented method of claim 16, wherein, when the bit of the identification code of the multiple-bit format for the first candidate reference frame is set to the first bit value to indicate the first candidate reference frame is the first reference frame for the decoded frame from the video, the immediately following bit of the identification code being set to the second bit value indicates the first candidate reference frame is not another reference frame for the decoded frame.

18. The computer-implemented method of claim 17, wherein, when the bit of the identification code of the multiple-bit format for the first candidate reference frame is set to the first bit value to indicate the first candidate reference frame is the first reference frame for the decoded frame from the video, and the immediately following bit of the identification code is set to the second bit value to indicate the first candidate reference frame is not another reference frame for the decoded frame, a next bit of the identification code being set to the first bit value indicates a second candidate reference frame is the second reference frame for the decoded frame.

19. The computer-implemented method of claim 16, wherein the decoding the bitstream to generate the decoded frame comprises a compound prediction using the first candidate reference frame as both the first reference frame and the second reference frame.

20. The computer-implemented method of claim 16, wherein the first candidate reference frame is from a decoded frame buffer of the decoder of the media player performing the decode.

21. The computer-implemented method of claim 16, wherein the identification code is according to the multiple-bit format when in a first mode, and the identification code is according to a second multiple-bit format when in a second mode, and the second multiple-bit format includes, when a bit of the identification code for the first candidate reference frame is set to the first bit value to indicate the first candidate reference frame is the first reference frame for the decoded frame, an immediately following bit of the identification code being set to the first bit value indicates a second candidate reference frame is the second reference frame for the decoded frame.

* * * * *